United States Patent [19]
Strickland et al.

[11] Patent Number: 5,867,806
[45] Date of Patent: Feb. 2, 1999

[54] SYSTEM AND METHOD FOR PERFORMING INVERSION ON LWD RESISTIVITY LOGS WITH ENHANCED RESOLUTION

[75] Inventors: Robert W. Strickland, Austin; Gulamabbas A. Merchant, Houston; Charles E. Jackson, Katy; Herbert Max Joseph Illfelder, Houston, all of Tex.

[73] Assignee: Halliburton Energy Services, Inc., Houston, Tex.

[21] Appl. No.: 734,772

[22] Filed: Oct. 22, 1996

Related U.S. Application Data

[60] Provisional application No. 60/013,356 Mar. 13, 1996.
[51] Int. Cl.$^6$ .................................................. G06F 19/00
[52] U.S. Cl. .................................................. 702/7
[58] Field of Search ................................. 364/421, 422; 324/338, 339, 368, 369, 342, 343

[56] References Cited

U.S. PATENT DOCUMENTS

| | | | |
|---|---|---|---|
| 4,482,959 | 11/1984 | Minne . | |
| 5,144,245 | 9/1992 | Wisler | 364/422 |
| 5,184,079 | 2/1993 | Barber | 364/422 |
| 5,210,691 | 5/1993 | Freedman et al. | 364/422 |
| 5,446,654 | 8/1995 | Chemali et al. . | |
| 5,666,057 | 9/1997 | Beard et al. | 364/422 |

OTHER PUBLICATIONS

Qing–Huo Liu et al., "Modeling Low–Frequency Electrode–Type Resistivity Tools in Invaded Thin Beds", IEEE Transactions on Geoscience and Remote Sensing, May 1994, vol. 32, Iss. 3, pp. 494–498.

Weng Cho Chew et al., "An Efficient Solution for the Response of Electrical Well Logging Tools in a Complex Enviornment, " IEEE Transactions on Geoscience and Remote Sensing, vol. 29, No. 2, Mar. 1, 1991, pp. 308–312.

Turner, K. et al., "A New Algorithm for Automatic Shoulder Bed Correction of Dual Laterolog Tools", SPWLA 32$^{nd}$ Annual Logging Symposium, Jun. 16–19, 1991, pp. 1–21.

*Primary Examiner*—Donald E. McElheny, Jr.
*Attorney, Agent, or Firm*—Conley, Rose & Tayon; Jeffrey C. Hood

[57] ABSTRACT

A system and method for performing inversion and for correcting for shoulder bed effect. The method enhances the resolution of wave propagation resistivity logs and corrects the logs for adjacent bed effects, whereby the resulting logs have a vertical response as good as wireline high-resolution induction logs. The method first performs logging while drilling on a formation to obtain LWD resistivity log data. The method then selects one or more control depths at one or more locations of each of a plurality of detected beds in the formation. The present invention includes a novel method for selecting bed boundaries from the log data, and the control depths are then determined based on the determined bed boundaries. The method then estimates the resistivity of each bed only at the selected control depths to produce an estimated resistivity of the beds. The method then computes a simulated log value at each control depth using a current estimate of the resistivity of the beds. The computed simulated log, is then compared to the actual log data at each control depth, and the resistivity of each bed is adjusted using the difference between the actual and simulated values at the control depths. The above method iteratively repeats a plurality of times until the simulated log substantially matches the actual log at the control depths.

40 Claims, 15 Drawing Sheets

Each iteration, the method adjusts the square profile to bring the computed values (indicated by plusses) closer to the target log values (indicated by targets).

The raw response of the CWR tool to the Oklahoma profile at various angles of relative dip.

The Oklahoma profiles at various dip angles from Fig. 8 corrected for shoulder effect.

Simulated CWR logs through two chirp formations at various angles of relative dip.
The vertical response varies with resistivity level and dip angle.

The logs from Fig.10 corrected for shoulder effect.
The corrected tool response is nearly independent of resistivity level and dip angle.

Simulated logs of invaded cases before and after the shoulder effect correction.
Without the correction, separation caused by shoulder effect hides the invasion profile.

A comparison of LWD CWR log to wireline high resolution resistivity log. The shoulder effect corrected CWR more nearly matches the wireline high resolution resistivity log. The intervals shown represent sections where thin beds present a challenge to accurate evaluation of formation properties

SYSTEM AND METHOD FOR PERFORMING INVERSION ON LWD RESISTIVITY LOGS WITH ENHANCED RESOLUTION

CONTINUATION DATA

This is a continuation of provisional application Ser. No. 60/013,356 filed Mar. 13, 1996 entitled "Enhanced Resolution LWD Resistivity Logs Using a New Inversion Technique."

FIELD OF THE INVENTION

The present invention relates to inversion techniques applied to resistivity logs, and more particularly to an LWD resistivity inversion system and method which determines the earth formation which matches the log at judiciously selected log points and which includes improved bed boundary selection, thereby providing improved resolution.

DESCRIPTION OF THE RELATED ART

Logging While Drilling (LWD) comprises drilling into the earth and recording information from sensors above the bit to produce a record of various formation parameters versus depth along the wellbore. One type of LWD sensor is the propagation tool that measures the resistivity of the earth near the sensor. One example of a propagation tool is referred to as the CWR (Compensated Wave Resistivity) tool, which is an LWD resistivity tool that operates at 2 MHz. The propagation tool is used to measure the phase difference and amplitude ratio of the voltage of its two receiver coils. The phase and attenuation measurements are converted into apparent resistivity measurements that accurately depict the true formation resistivity in thick, uniform zones.

Wave propagation resistivity is the primary resistivity measurement used in logging while drilling. In high resistivity environments, the LWD logs frequently have poorer vertical resolution and more adjacent bed effect than their wireline induction or resistivity counterparts.

The apparent resistivity measurements of the propagation tool in LWD are subject to several environmental effects. These environmental effects include an effect referred to as the shoulder bed effect, also known as adjacent bed effect. The shoulder bed effect occurs when the shoulder beds or surrounding beds of the formation or bed of interest have significantly different resistivity values than the zone or bed of interest. In other words, the shoulder bed effect occurs when the apparent resistivity measurements are affected not only by the formation between the receivers but also the formation between the transmitters and the receivers, and by the beds above or below the tool. The shoulder effect is the error in the measurement in the zone of interest caused by the shoulder beds.

This adjacent bed effect varies with the actual resistivity value as well as the contrast. The attenuation resistivity logs have more adjacent bed effects and poorer vertical resolution than the phase resistivity logs. Thus, if a formation is infinitely long and homogenous, then the resistivity can be accurately measured regardless of the bed spacings. However, where the zone or bed of interest is "sandwiched" between lower resistivity beds, referred to as shoulder beds, the resistivity measurement is affected. Moreover the vertical resolution of the tool is highly dependent on the effective average background resistivity ($R_{Eb}$). Also, the resolutions of both the phase resistivity ($R_{Ph}$) and the attenuation resistivity ($R_{At}$) degrade as the $R_{Eb}$ increases. This occurs even though the phase resistivity ($R_{Ph}$) has sharper vertical resolution than the attenuation resistivity ($R_{At}$) at the same transmitter/receiver spacing.

Generally, the attenuation resistivity $R_{At}$ has a larger diameter of investigation than the phase resistivity, $R_{ph}$. Thus, in a thick un-invaded bed, both measurements read the same, but they separate in the presence of invasion. However, in thin beds if $R_{Ph}$ and $R_{At}$ separate it is difficult to identify whether it is due to the shoulder bed effect or invasion. Clearly, a better interpretation of measurements with different diameters of investigation can be made if the vertical resolutions of all the logs are made equal, preferably to the highest resolution measurement.

Various approaches have been used to improve the vertical response and reduce the shoulder effect. These include adaptive deconvolution, mixed deconvolution with layered inversion, and 2-D inversion.

INVERSION VS. DECONVOLUTION

Two techniques or methods are generally used to correct for shoulder effect, these being (1) deconvolution or inverse filtering, and (2) inversion. Most deconvolution methods are based on prior knowledge of the sensors' spatial sensitivity gained from mathematical models of the tool's response. The deconvolution filters, which may be either linear or nonlinear, are designed to be applied directly to the data. The filters are designed using computer models of the tools to determine the appropriate filter coefficients. These filters are generally quite fast because the method relies on convolving filters with the logs. The deconvolution techniques work best if the problem is linear or can be linearized by some transformation.

Phasor processing for induction tools uses a filtered version of out-of-phase signal to linearize the log response. The HRI processing uses the in-phase-signal raised to a power and filtered to linearize the log response. No analogous transformation is believed to exist for the propagation tools. Their spatial response varies with the formation resistivity and contrast.

In the inversion method, LWD is performed to produce resistivity logs. Also, an approximate or estimated model of the formation is made. This model of the formation essentially comprises a "guess" as to the characteristics of the formation. After the model of the formation is generated, a computer model of the tool is used to transform the model formation into a simulated log response. This simulated log response is then compared with the actual log data. One or more parameters of the model formation are then adjusted based on this comparison of the simulated log response to the actual log data, a new comparison is made, and the above process repeats. Thus the inversion algorithm iteratively refines the model formation until the simulated log matches the actual log.

The term "inversion" is used because the problem of correcting the logs is the "inverse" of the mathematical model that computes a log response from a model formation. The computer routine that simulates the response of the tool is referred to as the "forward model." Inversion is generally slower than deconvolution techniques. However, inversion is better suited to nonlinear problems.

Inversion methods are computationally intensive. The forward model attempts to capture the physics of the problem, subject to the simplifying assumptions which may have been applied. The forward model may take the form of a Born series, a propagated geometric factor, or a full fledged solution of Maxwell's Equations. Depending upon the choice of forward model, the computation may be complex and slow. However, newer 1-D forward modeling codes using Hankel transforms are available which are quite fast and can be used with advantage in inversion.

The inversion method has several advantages over deconvolution. First, inversion is more flexible than deconvolution. With the filter method, if the propagation tool is changed, a new suite of filters must be designed, which is sometimes problematic. Since the design of the filters is entirely separate from their use, the software is typically designed and maintained by different groups. The inversion technique is more selfcontained since the tool response model is built-in. If the tool is changed, it is comparatively simple to change the forward model, usually changing only a few lines of code or an input file. Also, if a new mathematical model is developed that is faster or more accurate, the new model is comparatively simple to install into an inversion program.

The primary disadvantage of inversion methods is their lack of speed. Computer programs that simulate tools are usually complex and slow, and when used in inversion, consume the vast majority of computer time. A second disadvantage of inversion methods is referred to as the uniqueness problem. Because of the finite vertical resolution of the tool, many different model formations can produce logs that are identical to within some tolerance. The root of the problem is that for beds much thinner than the resolution of the tool, the product of thickness and conductivity matters most to the log response. Two beds, one that is one inch thick and one that is two inches thick, will look approximately the same to the tool if the first has a conductivity twice that of the second. Any inversion technique must confront this problem.

In one semi-automatic method of shoulder effect correction, an estimate is made of the bedding geometry and the formation resistivities, and a computer program is used to iteratively refine the bed boundaries and resistivities until the simulated log matches the measured log. Thus, the unknowns to be determined are the zone boundaries and resistivities, and each of these parameters are refined until a match is obtained.

One such method is described in Lin, "The Inversion of Induction Logging Data Using the Least Squares Technique," Yih-Yih Lin, Stan Gianzero, and Robert Strickland, SPWLA, Paper AA, 1984. The Lin method uses a standard nonlinear function minimization routine. The resistivities and boundary locations are the unknowns and the difference of the measured and simulated log at each depth is the array of functions to be minimized. The operator chooses the number of beds plus the number of boundaries to be less than the number of logging points so the problem is over-determined. The chief disadvantage of this method is that an operator must choose the basic geometry.

Another inversion method is referred to as maximum entropy inversion, which is discussed in "Maximum Entropy Inversion" by Christopher Dios, SPWLA 1987. The maximum entropy inversion method computes a continuous, or finely-sampled, resistivity profile which would have produced the measured log. Typically, one thin bed is constructed for each sample of the log. Since the sampling rate should be much smaller than the vertical resolution of the tool, one can find many resistivity profiles (model formations) that produce the same modeled log response to within the tolerance of the measurement. The maximum entropy method picks the solution with the most entropy, the solution with the least "information." The chief drawback of this method is the fine sampling rate of the computed log. As noted above, one thin bed is constructed for each sample of the log, and thus the large number of beds can slow down the computation of the forward model.

Typical inversion techniques involve determination of formation model parameters such that the simulated tool response matches the measured log as closely as possible. Generally the attempt is to match the entire log at all depths. U.S. Pat. No. 5,446,654 to Chemali et al. titled "Shoulder Effect Logging Method" which issued Aug. 29, 1995, discloses a method for correcting laterologs for shoulder effect. This method was used in the CORLAT program for correcting laterologs for shoulder effect, as discussed in "A New Method of Correcting the Dual Laterolog for Shoulder Effect," by Kagan Tumer, Roland Chemali, and David Torres, SPWLA. The CORLAT software uses a LOG filter, the "Laplacian of a Gaussian," to find bed boundaries. The CORLAT method was a one-pass technique and was not suitable for use with propagation tools, since propagation resistivity logs typically have more shoulder effect than do laterologs.

Many times inversion methods do not provide sufficient resolution and/or do not adequately correct for adjacent bed effects. Therefore, an improved inversion system and method is desired which provides enhanced resolution and which also better corrects for adjacent bed effects. An improved inversion system and method is also desired which has improved vertical response and which is computationally efficient.

SUMMARY OF THE INVENTION

The present invention comprises an improved system and method for performing inversion and for correcting for shoulder bed effect. The method enhances the resolution of wave propagation resistivity logs and corrects the logs for adjacent bed effects, whereby the resulting logs have a vertical response as good as wireline high-resolution induction logs.

The method of the present invention for performing inversion and correcting for shoulder bed effects first performs logging while drilling on a formation to obtain LWD resistivity log data. The method then selects one or more control depths at one or more locations of each of a plurality of detected beds in the formation. The present invention includes a novel method for selecting bed boundaries from the log data, and the control depths are then determined based on the determined bed boundaries.

The method then estimates the resistivity of each bed only at the selected control depths, wherein the estimate uses the log data. The method then computes a simulated log value at each control depth using the current or initial estimate of the resistivity of the beds. The computed simulated log is then compared to the actual log data at each control depth, and the resistivity of each bed is adjusted using the difference between the actual and simulated values at the control depths. The above method iteratively repeats a plurality of times until the simulated log substantially matches the actual log at the control depths. Once the simulated log substantially matches the actual log at the control depths, the method then constructs a corrected log from the depths of the bed boundaries and the resistivity of each bed.

As mentioned above, the present invention includes a novel method for determining the bed boundaries in the formation. First, the method performs a curve fit of the log data. This curve fit preferably comprises fitting a cubic polynomial in depth measured along the wellbore to the conductivity using a weighted linear least-squares method. The curve fit may also comprise fitting a cubic polynomial in depth to the logarithm of the conductivity, depending on the dip angle. (In the present application, depth is measured along the wellbore unless otherwise specified). The curve fit of the log data is performed a plurality of times on portions of the log data using a windowing method. This windowing method comprises moving a window across the log data at periodic increments, and performing the curve fit on the window of log data at the periodic increments as the window is moved across the log data. The method then determines inflection points of the log data after the curve fit for each of the windows. The method then selects bed boundaries from the inflection points of the curve-fit of the log data.

The method of the present invention thus selects significant bed boundaries from the actual log and performs inversion by repeatedly adjusting the resistivities in a model formation until the simulated log matches the actual log at selected points. Additionally, the technique can enhance the resolution of the attenuation resistivity logs to match the resolution of the phase resistivity logs. The result is a suite of resistivity logs with matched vertical responses but different radial depths of investigation. The resulting vertical response is virtually independent of resistivity.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Logging While Drilling

Figure 1:
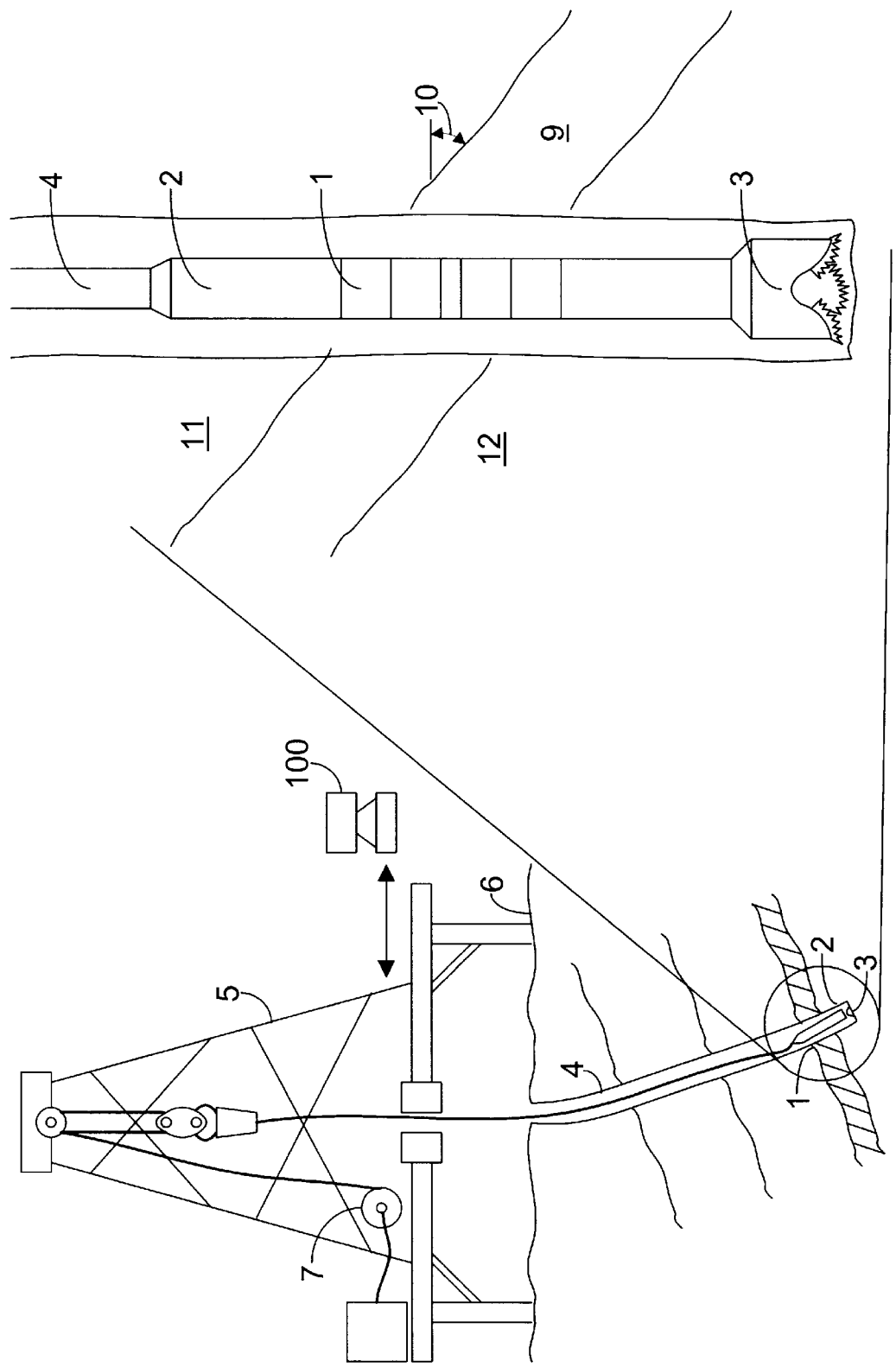
FIG. 1 illustrates logging while drilling (LWD) to obtain log data according to the present invention.

Referring now to FIG. 1, a diagram illustrating a LWD application is shown. As shown, LWD involves using a propagation tool while drilling into the ground. The propagation tool includes one or more transmitters and one or more receiver pairs. The propagation tool provides log data to a computer system at the surface.

As shown in FIG. 1, an LWD sensor 1 is mounted in a drill collar 2 above the bit 3 suspended by drill pipe 4 from a drilling rig 5 beneath the surface of the earth 6. The draw works 7 control the depth of the bit 3. Computer 100 records the depth as a function of time. The sensor 1 is located in a formation 9 and attempting to measure the formation layer or bed 9 that intersects the well bore axis at the relative dip angle 10. The measurements in bed 9 are adversely affected by adjacent (shoulder) beds 11 and 12. The drill collar 2 includes electronics that measure the sensor outputs and store them as a function of time or transmit them to the surface computer 100. The computer 100 matches up the sensor measurements with the corresponding depths and produces an LWD log of sensor measurements versus depth. It is the objective of the invention to correct log readings in zone 9 for the effects of adjacent beds 11 and 12 as well as other beds below bed 12 or above bed 11.

FIG. 2—CWR Tool

Figure 2:
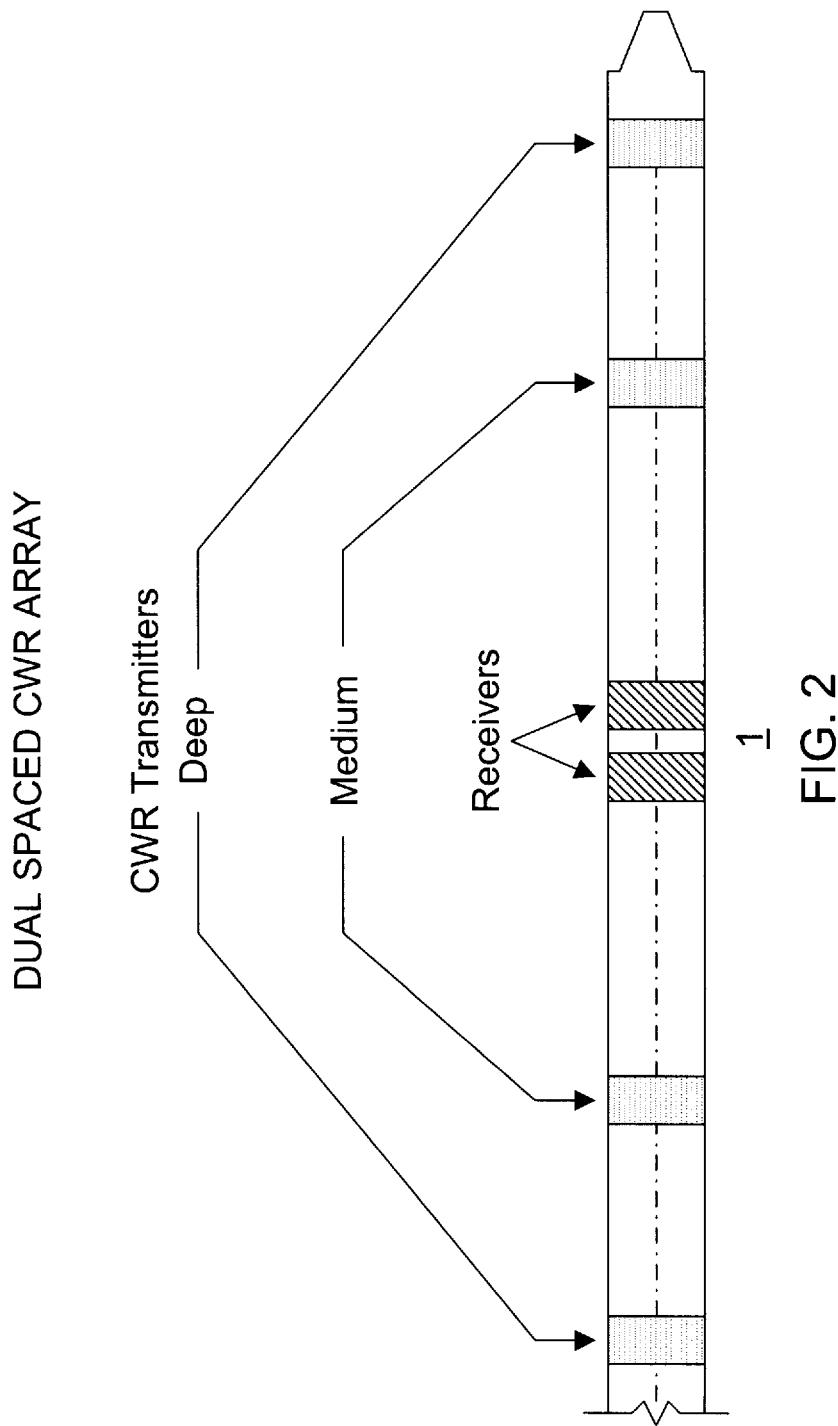
FIG. 2 illustrates a continuous wave resistivity propagation tool used in the preferred embodiment.

Referring now to FIG. 2, a CWR (Compensated Wave Resistivity) tool is shown. The CWR propagation tool is an LWD resistivity tool that operates at 2 MHz and which measures the phase difference and amplitude ratio of the voltage of its two receiver coils. In the present disclosure, a tool which measures one or more of the phase difference and amplitude ratio of a voltage at its receiver coils is referred to as a propagation tool. The phase and attenuation measurements are measured separately, and the surface computer shown in FIG. 1 converts each to an apparent resistivity measurement.

As discussed above, the apparent resistivity measurements of propagation tools are afflicted with several environmental effects. Perhaps the most severe is that of shoulder effect, also known as adjacent bed effect. The tool responds not only to the region between the receiver coils but also to the entire region from transmitter to receiver plus a smaller region above and below the coils. The system and method of the present invention corrects the CWR for shoulder effect.

Figure 3:
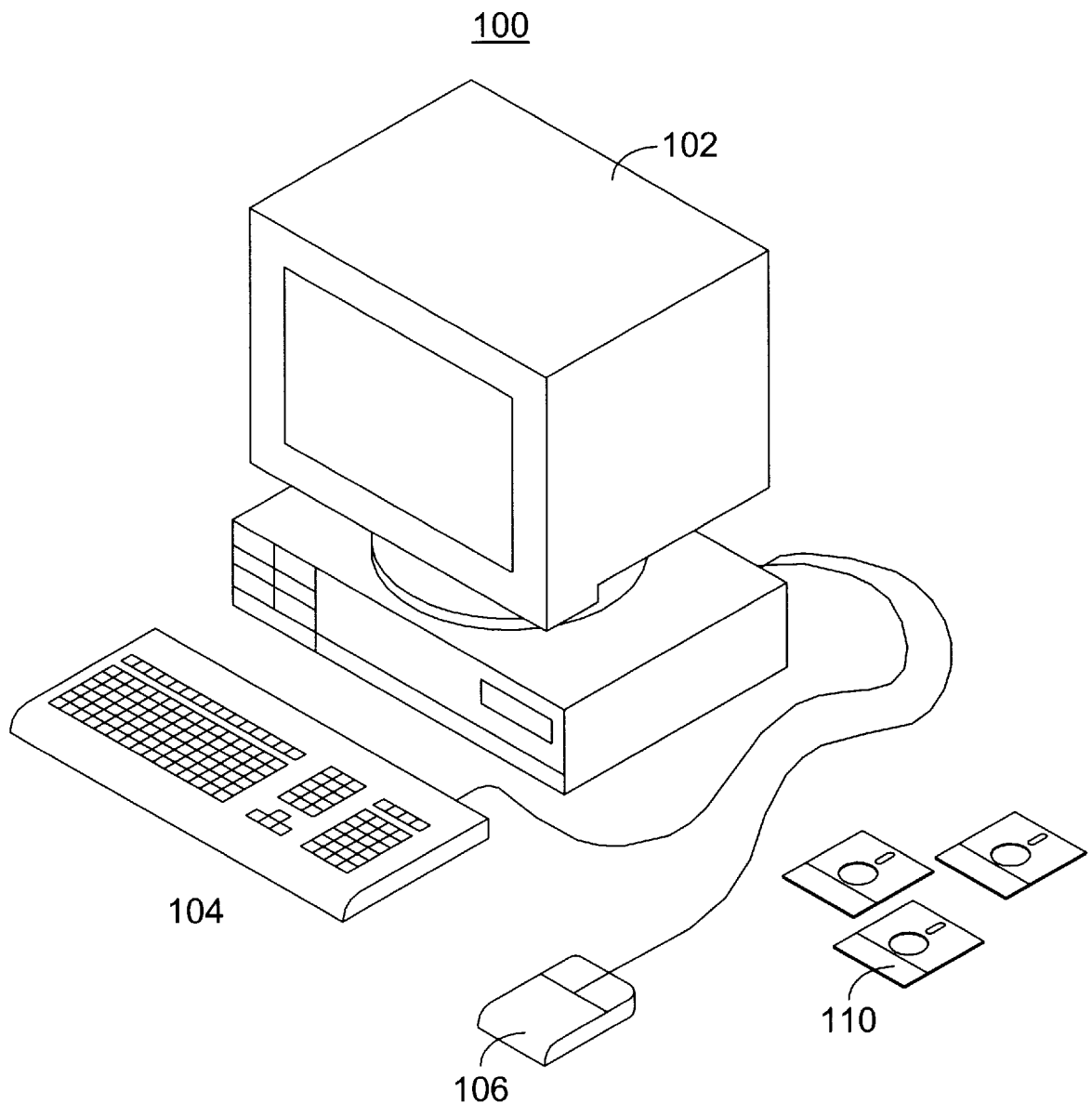
FIG. 3 illustrates a computer system which performs analysis and shoulder bed correction on LWD log data.

FIG. 3—Computer System

Referring now to FIG. 3, an illustrative computer system 100 which is programmed according to the present invention and which operates on log data to correct for shoulder bed effect according to the present invention is shown. The computer system 100 comprises a video display screen 102, a keyboard 104, and a pointing device such as a mouse 106, as shown. The computer system 100 also includes various standard components, including at least one central processing unit (CPU), memory, a hard drive, one or more buses, and a power supply (all not shown). The computer system preferably includes a memory media, such as magnetic media or floppy disk(s) 110, on which computer programs according to the present invention are stored. In the preferred embodiment, the present invention comprises a software program stored on the memory and/or hard drive of the computer 100 and executed by the CPU. The CPU executing code and data from the memory thus comprises a means for executing the steps described below. The computer system 100 is thus used to operate on IWD log data to correct for shoulder bed effect according to the present invention, as described below.

FIG. 4—Flowchart Diagram

Figure 4A:
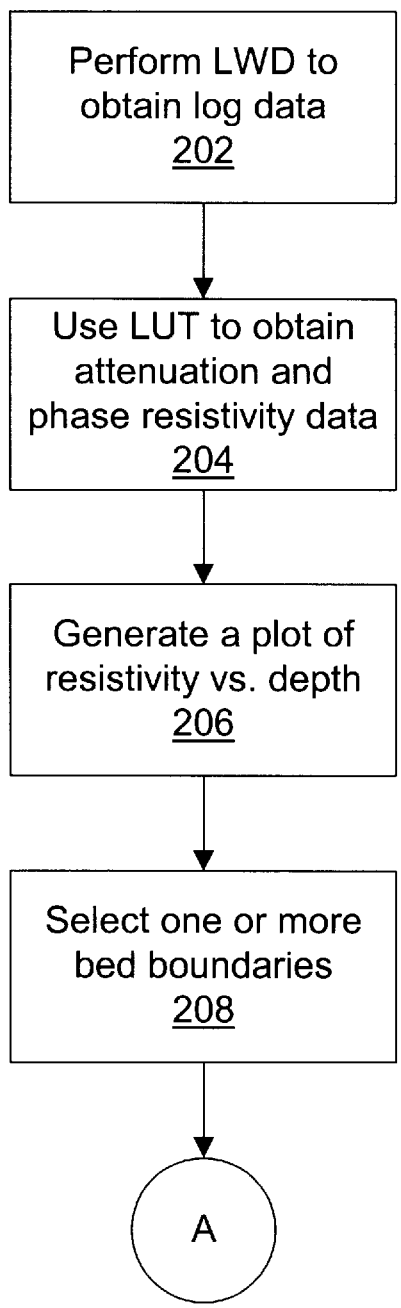
FIGS. 4A–4C are a flowchart diagram illustrating operation of the method for correcting for shoulder effect according to the preferred embodiment of the invention.
Figure 4B:
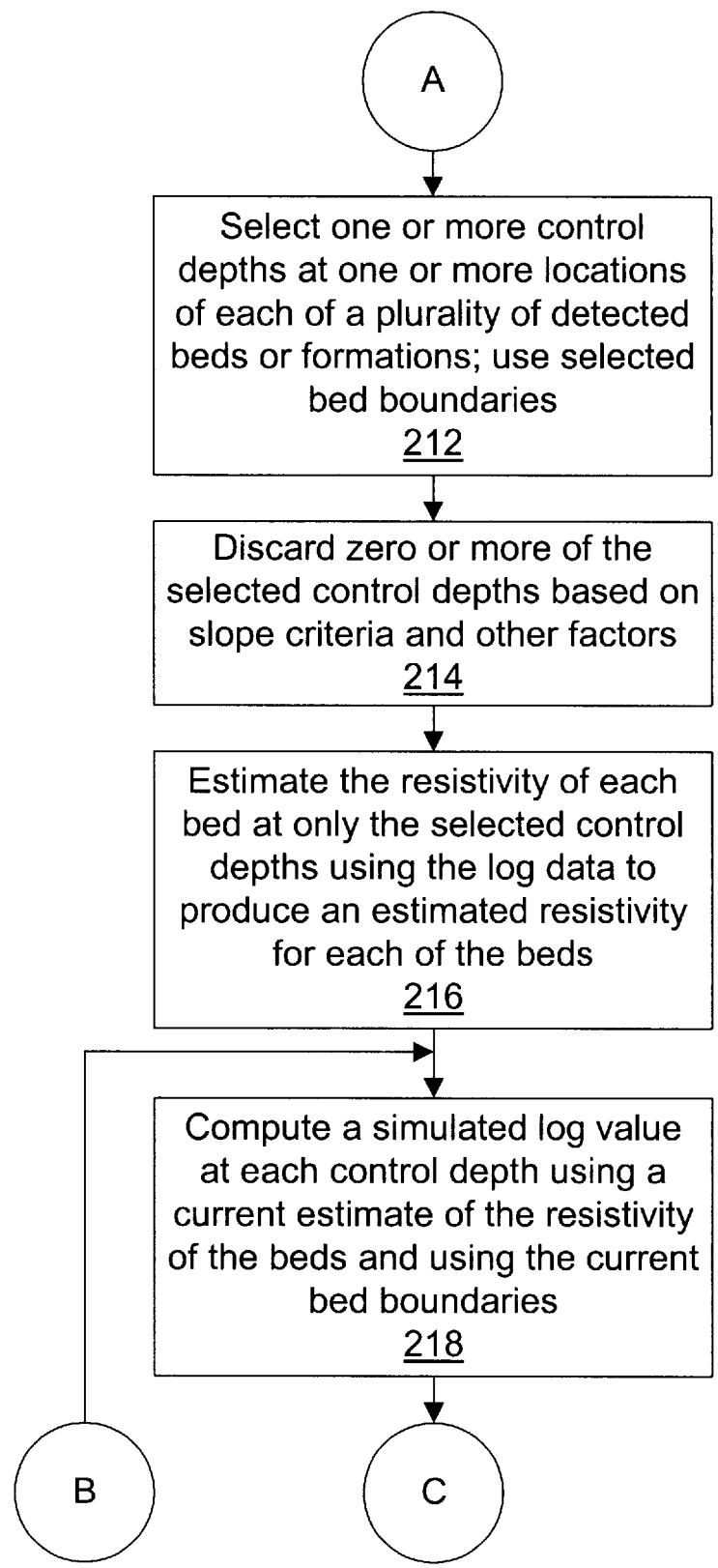
Figure 4C:
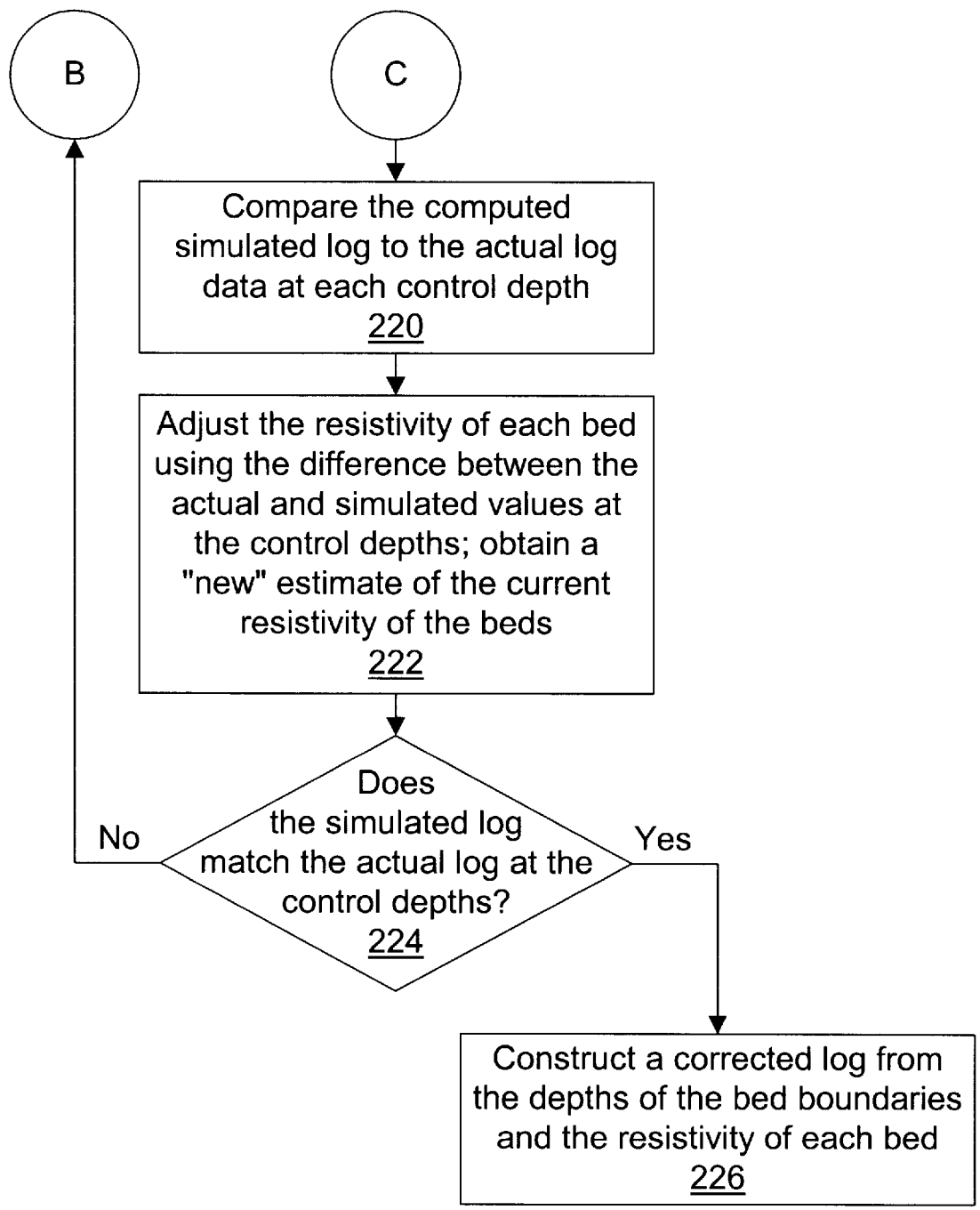

Referring now to FIG. 4, a flowchart diagram illustrating operation of the inversion method of the present invention is shown. The flowchart of FIG. 4 is shown in three sheets as FIGS. 4A–4C, and interconnections between FIGS. 4A–4C are shown by reference numerals A–C.

As shown, in step 202 the method performs logging while drilling to obtain log data. In other words, in step 202 a propagation tool is used while drilling into the ground, whereby the propagation tool includes at least one transmitter and at least one receiver pair to perform logging while drilling (LWD) to obtain log data. It is noted that the propagation tool may be any of various types of tools as desired. It is also noted that the drilling may occur at any of various desired angles, as desired. The result of step 202 comprises log data of the various formations where the drilling occurred.

In step 204 the method uses a look-up table to obtain attenuation and phase resistivity data from the log data. It is noted that the log attenuation data is generally in terms of decibels (dBs), and the phase data is normally in terms of degrees. In step 204, this log data is converted into attenuation and phase resistivity data, i.e., into units of ohm.m or Siemens, to enable this data to be more easily used by the inversion method. In the preferred embodiment, step 204 uses a look-up table to perform this conversion to obtain the attenuation and phase resistivity data. However, it is noted that other techniques may be used to convert the log data into the desired attenuation and phase resistivity data, as desired.

In step 206 the inversion method optionally plots the resistivity versus depth for the LWD data. The inversion method may also plot conductivity versus depth for the log data. This data provides various information regarding the formations encountered by the tool during drilling. It is noted that this data may be substantially correct if the formations have sufficient thickness, i.e., there is no shoulder bed or adjacent bed effect or other effects. The remainder of the method described below comprises an inversion system and method according to the present invention for correcting the data or plot obtained in step 206 to correct for the shoulder bed effect, also referred to as the side bed effect or adjacent bed effect.

It is noted that the log data may be obtained by other methods, such as induction logging, wireline logging, and laterologging. The present invention may thus be used to correct for shoulder effect in log data, regardless of how the log data is obtained.

In step 208 the inversion method selects one or more bed boundaries based on the plot of resistivity verses depth. In the preferred embodiment, the inversion method in step 208 first finds a set of inflection points from the log data, and then selects one or more bed boundaries at selected ones of the inflection points. It is noted that various methods may be used to find or determine the bed boundaries from the log data in step 208.

In order to find the inflection points and hence find the bed boundaries in step 208, the method of the preferred embodiment uses a windowing technique whereby a sliding window is moved across the log data in increments, and the log data in this window is analyzed for one or more inflection points. The method of selecting bed boundaries and the windowing technique of the preferred embodiment is described further below.

After one or more bed boundaries are selected based on the inflection points in step 208, then operation proceeds to step 212 (FIG. 4B). In step 212 the method selects one or more control depths at one or more locations in each of the plurality of detected beds or formations. Thus, in step 212 one or more control depths are selected at a plurality of the beds or formations between the bed boundaries which were selected in step 208. It is noted that the bed boundaries selected in step 208 are used to define the beds or formations, and the control depths are selected in step 212 based on these selected bed boundaries.

In step 214 the method discards zero or more of the selected control depths which were selected in step 212. Zero or more of the selected control depths are discarded based on slope criteria as well as other factors, as desired. It is noted that in step 208 a greater number of inflection points may be found than which accurately represent bed boundaries. In other words, the log data includes a plurality of inflection points which actually represent bed boundaries, and may include additional and relatively minor inflection points which do not indicate bed boundaries. In step 214 a methodology is used to discard zero or more of the selected control depths based on a criteria which determines if certain of the inflection points do not actually represent bed boundaries. This methodology preferably uses slope criteria and other factors to determine if a selected control depth should be discarded. It is noted that step 214 is preferably applied to speed up the calculations, i.e., to remove the necessity of processing control depths which do not actually correspond to detected beds. It is further noted that step 214 is optional and may not be performed as desired.

In step 216 the method estimates the resistivity at each bed at only the selected control depths. In step 216 the resistivity of each bed is estimated at only the selected control depths using the log data to produce an estimated resistivity for each of the beds. Thus, the system and method of the present invention only estimates the resistivity at the selected control depths. This is in contrast to current prior art techniques which generally estimate the resistivity continuously at all of the various points of the log data. According to the system and method of the present invention, during the inversion process the resistivity is estimated only at the selected control depths. Thus, the method of the present invention differs fundamentally from current prior art methods. In other words, instead of attempting to find a continuous resistivity profile that could have produced the measured log, the method of the present invention seeks to find a stack of much fewer discrete beds of uniform resistivity which match the measured log at the selected control depths.

In step 218 the method computes a simulated log value at each control depth using the current estimate of the resistivity of the beds and also using the current bed boundaries selected in step 210.

In step 220 the method compares the computed simulated log in step 218 to the actual log data at each of the control depths selected in step 212. In step 222 the method adjusts the resistivity of each bed using the difference between the actual and simulated values of the control depths. Thus, in step 222 the method obtains a new current estimate of the resistivity of the beds.

In step 224 the method determines if the simulated log matches the actual log at the selected control depths. If so, then the method advances to step 226. If the simulated logs do not match the actual log at the selected control depths in step 224, then the method returns and repeats operation of steps 218–222. When the method returns to repeat step 218, the method uses the new current estimate of the resistivity which was calculated in step 222. Thus, during the first iteration of steps 218–222 the method in step 218 uses the initial estimated resistivity, which was estimated in step 216. On subsequent iterations through steps 218–222, the method uses the adjusted resistivity calculated in step 222 as the new current estimate, and this adjusted resistivity is used in the subsequent iteration in step 218. It is noted that steps 218–222 may be performed for a plurality of iterations until the simulated log substantially matches the actual log at the control depths. In the preferred embodiment, the simulated log substantially matches the actual log at the control depths after four passes through steps 218 through 222.

Once the simulated log matches the actual log at the control depths in step 224, the method advances to step 226. In step 226 the method constructs a corrected log from the depths of the bed boundaries and using the resistivity of each bed. Operation then completes.

Figure 5:
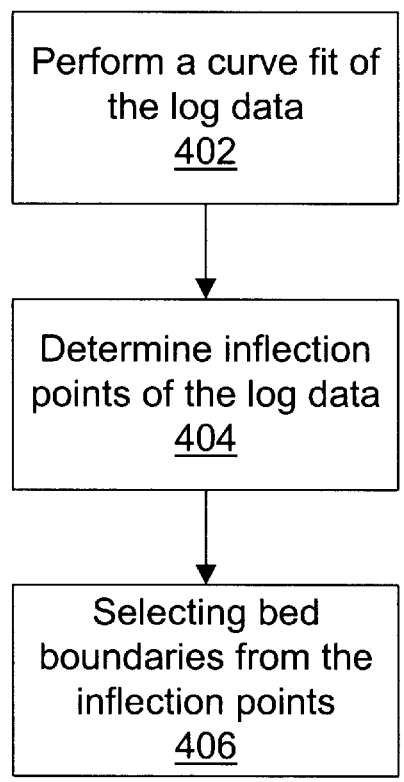
FIG. 5 is a flowchart diagram illustrating selection of one or more be boundaries.
Figure 6:
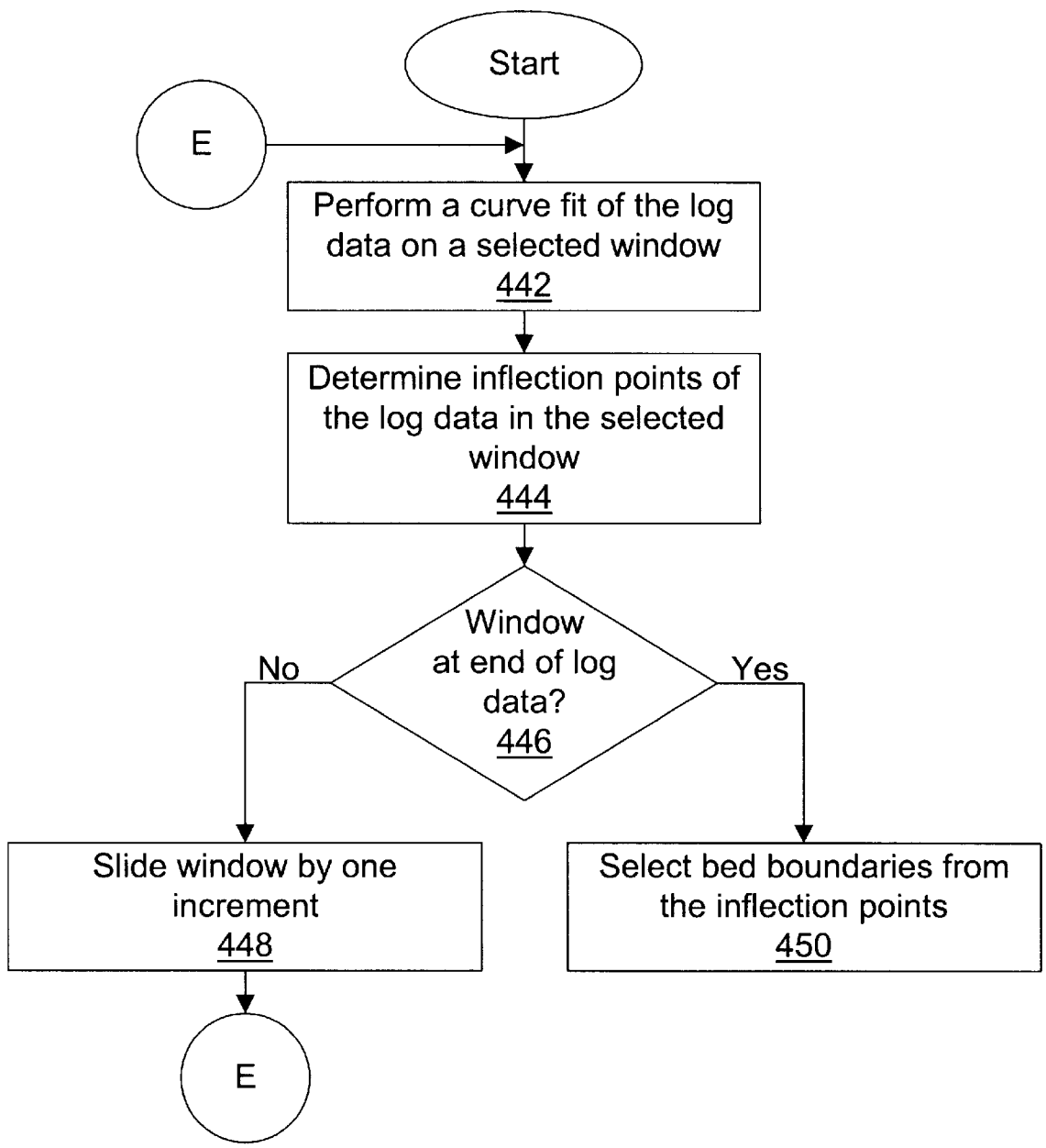
FIG. 6 is a more detailed flowchart diagram illustrating selection of one or more be boundaries using a windowing method.

Step 208—Bed Boundary Detection (FIGS. 5 and 6)

In step 208 the inversion method selects one or more bed boundaries from the log data. The present invention includes a unique and novel method of selecting bed boundaries by finding a set of inflection points from the log data and using these inflection points to determine the bed boundaries. Referring now to FIG. 5, a flowchart diagram illustrating operation of the method is shown. As shown, in step 402 the method performs a curve fit of the log data. In step 404 the method determines inflection points of the log data after performing the curve fit of the log data. It is noted that various methods may be used to find or determine the inflection points from the log data. In step 406 the method selects bed boundaries from the inflection points of the curve-fit of the log data. Thus, once these inflection points are found, the method selects one or more bed boundaries at selected ones of the inflection points.

In order to properly find the bed boundaries in step 208, the method of the preferred embodiment uses a windowing technique in steps 402 and 404 of FIG. 5. In this windowing technique, a sliding window is moved across the log data in increments, preferably 3-inch increments, and the log data in each of the windows is analyzed for one or more inflection points.

Referring now to FIG. 6, a more detailed flowchart diagram illustrating operation of the method is shown. As shown, in step 442 the method performs a curve fit of the log data on a selected window. The window represents a portion or snapshot of the respective log data. The length of the window is preferably 4 or 5 feet.

In step 444 the method determines inflection points of the log data in the selected window of step 442. It is noted that various methods may be used to find or determine the inflection points from the log data. In step 446 the method determines if the window is at the end of the log data. If not, then in step 448 the method increments or slides the window across the log data by one increment, and operation of steps 442 and 444 repeats. The method preferably slides the window by 3 inches or a quarter foot across the log data. It is noted that the window may be a moved at a greater or lesser granularity, as desired.

If the window is at the end of the log data in step 446, then in step 450 the method selects bed boundaries from the inflection points of the curve-fit from each of the windows of the log data. Thus, once these inflection points are found, the method selects one or more bed boundaries at selected ones of the inflection points.

In the preferred embodiment, where the same inflection point is found in a plurality of different consecutive windows, the inflection point is selected in the respective window where the inflection point is at the nearest point in the center of the respective window. Selecting the inflection point in the respective window where the inflection point is closest to the center of the respective window provides the most accurate data regarding the inflection point.

In performing the curve fit in step 442, the method of the present invention curve fits a cubic polynomial in depth to the apparent conductivity using the method of weighted linear least-squares. It is noted that the curve fit may be performed to the conductivity or the resistivity. In the present disclosure, the term "conductivity" is intended to refer to both conductivity and resistivity, and vice versa.

The weighting function is preferably Gaussian in depth measured along the borehole. However, other functions may be used, such as a triangular function or a raised cosine function. A new least-squares fit is performed every quarter foot. The length of the window and the width of the Gaussian is preferably chosen experimentally so that all of the boundaries in the "Oklahoma" profile are detected. For more information on the Oklahoma profile, please see "Introduction to the Digital Induction Tool," T. D Barber, SPE 58th Annual Technical Conference, 1983, Paper SPE 12049.

The functional form of the curve fit whose inflection points most precisely estimate the depths of the bed boundaries was found to vary with the relative dip angle. For dip angles less than about 30°, a least-squares fit to the phase conductivity versus depth, that is the reciprocal of the phase resistivity versus depth, is preferably used. A least-squares fit to the phase conductivity for smaller dip angles produces inflection points that most accurately estimate the location of the bed boundaries. For dip angles in the range 30° to 65°, a curve fit to the logarithm of the phase resistivity is preferably used. Other non-linear transforms of the phase resistivity may also be used, as described.

The value of the cubic polynomial at the center of the fit window is stored for comparison with wireline logs. As the window moves in quarter foot increments, a smooth log is generated. This log can be compared easily to wireline logs since the depth increments are constant. The curve fit also smoothes out noise in the log that is higher in spatial frequency than the vertical resolution of the tool. It is important to note that the fitted cubic polynomial is preferably only evaluated at the center of the window, and then the entire window is moved a quarter foot and a new fit is made. For low angles of relative dip (<30°), the inflection points in conductivity proved much more accurate than the inflection points in either resistivity or logarithm of resistivity.

For numerical stability, the method subtracts an offset from depth prior to performing the fit so that the transformed depth is zero at the center of the fit window. This greatly decreases the round-off error in computing the least-squares fit. The value of the fit at the center of the window is just the constant term in the cubic.

A cubic polynomial has a single inflection point where its second derivative of conductivity with respect to depth is zero. For the cubic equation $$\sigma = a + bz + cz^2 + dz^3$$

the inflection can be found by taking the second derivative and setting it equal to zero and solving for depth. This yields the depth $z = -c/3d$. This depth will not necessarily fall on one of the three inch samples. This is of no consequence because this depth can be plugged into the curve-fit to obtain the conductivity at the boundary. This conductivity is necessary to select the control points, as discussed below.

The Gaussian weighting function has several benefits. The width of the Gaussian weighting function can be controlled with one free parameter. The Gaussian weighting function also creates a degree of smoothness as the fit window moves over the log. If all points in the window were weighted equally, one noisy sample would be more likely to produce a step when it enters the curve fit window. The Gaussian weighting function also gives the bed detection method a degree of adaptability to varying density of data samples. If there are many samples in the window distributed over the whole window, the weight function will weight the center of the window much more heavily in performing the fit. At the other extreme, if there are only four points in the window, the fit will produce the cubic that exactly passes through the four points regardless of the weighting function. For adequate noise rejection, the practical limit is about eight points in the window.

At a particular window location, the inflection point might be anywhere in the window, or it might be beyond its ends. An inflection point is only considered if the inflection point is within a certain distance $\Delta$ to the center of the window. This $\Delta$ is preferably more than half the depth increment of the fit, or there is a danger that an inflection point might not be recorded. A value of $\Delta$ equal to the depth increment is provided to reduce this likelihood. There is also a possibility that the curve fits for adjacent windows will find approximately the same inflection points, and both might be within their limits, so the boundary-detection method preferably includes logic to discard a boundary if the boundary is closer than a certain distance from the previous one.

The method preferably operates to discard less important boundaries by examining the absolute value of the first derivative of the logarithm of the resistivity with respect to depth. One method is to discard all bed boundaries with low absolute values of this first derivative. Another method is to examine pairs of bed boundaries closer in depth than a certain tolerance. If the first derivative at both control depths has the same sign, the boundary whose first derivative is smaller in absolute magnitude is preferably discarded, otherwise both boundaries are retained. Both of the above methods, when applied together, were found to greatly reduce the number of beds while retaining the significant boundaries. This is important because the running time depends on the square of the number of beds.

There is also the possibility that if a resistivity transition is gradual or if there are a series of beds thinner than the resolution of the tool, then there may not be enough beds for the inversion to succeed. The inversion may not succeed because there are not enough degrees of freedom to match the simulated log to the actual log. Thus the present invention includes logic to supply additional boundaries if there are few beds. Thus, there is a maximum bed thickness that is enforced.

In simulated logs with step resistivity changes, the method will find some extra inflection points near where the transmitters cross the boundaries. These extra boundaries are usually only evident in simulations. Actual logs generally do not suffer from these extra boundaries. This is presumed to be because nature is usually more complicated than simulations.

In one embodiment of the invention, the length of the window is divided into bins of quarter foot. The depth of each sample is rounded off to the nearest quarter foot, and the conductivity of the sample is added to the bin and the number is incremented. As the window is moved past the log, samples are discarded on one end and added on the other. The window is preferably maintained in memory as a circular buffer. A pointer is moved through a stationary array of log. It points to the "seam" where the new data overwrites the old. When the seam pointer gets to the end of the array, the pointer is repositioned at the first of the array. The number of samples in each bin is multiplied by the Gaussian weight, so bins with more samples are weighted more heavily.

The determination of the bed boundaries is important to the operation of the present invention. With simulated data, many inversion procedures work very well when using known bed boundaries. However, difficulties arise when the boundaries also have to be determined from the measured log. It was observed that for a symmetric tool the inflection points on the log generally give accurate location of the boundaries. Thus, in the preferred embodiment, the inflection points for the Compensated Wave Resistivity (CWR) tool are obtained by the curve fit.

Step 212—Control Depth Selection

The depth of the control point for a bed is preferably derived from the depths and resistivities of the inflection points that define the bed. If the depths of two adjacent inflection points are $z1$ and $z2$, and the resistivities at these depths are $R1$ and $R2$, the control point is placed at the depth $z=pz_1+(1-p)z_2$, where $p=R_1/2R_2$ if $R_1<R_2$ or $p=1-R_2/2R_1$ if $R_2<R_1$.

This was empirically determined to locate approximately the peaks of beds with asymmetrical shoulders. For simplicity, the depth of the control point is rounded off to the nearest quarter foot since the curve fit has been tabulated already by the code that fits the log and finds the inflection points. Thus only the values of the fit at quarter foot increments are kept, and the actual coefficients of the fit are discarded.

The control points which are selected and used for matching may be determined in other various ways. In one embodiment, the method uses the middle of the bed, which is the simplest method. An alternative is to use the local maximum or minimum within a bed. If the log is changing monotonically in that region, the middle of the bed is a reasonable choice. It was found beneficial to restrict the parameter p to the range $\frac{1}{3}<p<\frac{2}{3}$ so that a control point is always within the center third of the bed.

Steps 218–222: Inversion

The inversion portion of the method itself is performed as follows. The value of conductivity at a particular control depth, $\sigma_{new}$, for the next iteration depends only on $\sigma_{old}$, the previous guess; $\sigma_{log}$, the log value from the curve fit; and $\sigma_{model}$, the apparent conductivity computed from the forward model. The formula is $$\sigma_{new}=\sigma_{old}+\overline{\omega}(\sigma_{log}-\sigma_{model}),$$

a value $\overline{\omega}=1$ was found to provide rapid convergence and good stability. The formula is applied at each control depth, and all conductivities vary with depth. It is noted that second-order methods that depend on the previous two iterations may be used, but it has been determined that these second order methods converge slower than the above equation.

The $\sigma_{model}$ is computed from the forward model of the entire layered bedding sequence, and its value at each depth includes the shoulder bed and propagation effects. Thus the above update formula indirectly includes the effect of the entire layered formation computed in the previous step. The parameter can change at each iteration. The choice of gives the Van Cittert's method as a special case of the above and converges with good stability.

The most time consuming step in the above method is the calculation of $\sigma_{model}$ from $\sigma_{old}$ using a forward model. The results are based on a layered formation modeling program using the discrete Hankel transform. The formation is assumed to be made up of homogeneous layers without borehole or invasion. The tool is assumed to be made up of small coils. This forward model is extremely fast and has the additional advantage that it can handle dipping beds. The dip angle is assumed to be known and constant. The result of the inversion process is a series of beds with a resistivity value for each bed. When the forward model is applied to this formation it produces a log very close to the original log. However it should be immediately evident that the rectangular log produced by inversion contains information higher in spatial frequencies than warranted by the original log. The final step is to smooth the rectangular log by a Gaussian filter to reduce these unrealistic frequencies.

Thus, except for the forward model, very little calculation is involved in the inversion method. The majority of the software is bookkeeping and involves very little calculation. The most computationally intensive part of the software apart from the forward model is in the curve fit for smoothing and boundary detection, and this step is performed only once.

Several points about the method of the present invention are noteworthy. For each iteration, only one forward model is computed per bed. The algorithm makes several passes through the log. At first glance, the formula to refine $\sigma_{new}$, the estimate of the conductivity of a bed, might appear to depend only on a single depth. This is a bit of an illusion since the conductivity computed by the forward model depends on a section of the log.

Step 218—The Forward Model

Inversion methods generally rely on a computer simulation of the tool, referred to as the forward model. In the preferred embodiment, the present invention uses modeling software available from Halliburton Co. in order to model propagation resistivity tools.

In one embodiment, the system uses an existing modeling software program referred to as DIPVOLT written by Sheymin Su, based on a derivation by Stan Gianzero SPWLA paper, 1984. The model uses a Hankel transform technique. The model simulates the coils as point magnetic dipoles. The bedding planes are parallel but can be tilted relative to the axis of the tool to simulate dip. In this embodiment, a small modification is made to the program to speed it up for the case of no dip. This is the simplest program for propagation tools that can model an arbitrary number of beds. This program neglects the finite size of the coils and the conductive mandrel down the center of the tool, and the borehole, a large simplification.

In alternate embodiments, two other programs include these effects which both use "hybrid" or semi-analytic methods. These methods are referred to as Chew's method and Gianzero's method. For more information on the Chew method, please see "An Efficient Solution for the Response of Electrical Well Logging Tools in a Complex Environment," Weng Cho Chew, Zaiping Nie, Quing-Huo Liu, Barbara Anderson, IEEE Transactions on Geoscience and Remote Sensing, Vol. 29, No. 2, Mar. 1991, pp. 208–313, which is hereby incorporated by reference in its entirety. These two methods differ in their choice of which axis to treat numerically and which to treat analytically.

In the preferred embodiment of the invention, the borehole and mandrel and finite size of the coils are safely ignored when correcting for shoulder effect. These elements can be ignored with no adverse consequence to the inversion method. In order to understand this simplifying assumption, it is important to understand the operation of the tool. Propagation tools measure the phase difference and amplitude ratio of the voltage across a pair of receiver coils. These phase and attenuation measurements are converted to apparent resistivities by the surface system using look-up tables. The look-up table used in the surface system is derived using the hybrid method and includes the mandrel, coils, and coil cut-outs.

It has been shown that the apparent resistivities predicted by the two models will match if the borehole effect is small. The phase and attenuation predicted by the models will not match, however. This means that the point coil model can be used to correct for shoulder effect if during the inversion the apparent resistivities are compared, and not phases or attenuations.

The preferred embodiment of the invention is capable of processing an arbitrarily long section of log. Thus, simplifying assumptions are made to reduce the length of log used in processing each point. A simulated log is computed from 0.2 ohm-m to 100 ohm-m, and all measurements reached 99 ohm-m by 17 feet from the bed boundary. Therefore, at any depth, formations more than 17 feet above or below the depth of interest make vanishingly small contribution to the measurement at the depth of interest. In using the forward model, at each depth, beds above and below this window are ignored and replaced with semi-infinite shoulder beds. This minimizes the number of beds.

Step 226—The Corrected Log

The rectangular log drawn from the depths of the boundaries and the resistivities at the control points appears to contain more information that it really does. The log is merely one of the many rectangular logs that could have produced the model log. This is the nature of the uniqueness problem. The final step in the processing is to take the rectangular log and produce from it the final processed log. The final processed log may then be used to evaluate the formation results. In this step the rectangular conductivity log is convolved with a Gaussian. This rounds off the corners and eliminates features sharper than the vertical resolution of the tool. The width of the Gaussian is selected to match the resolution of the tool. Since the rectangular log is piecewise-constant, the Gaussian can be integrated analytically. The contribution of each bed is the conductivity of the bed times the difference of the error function at the bed boundaries. The error function is then defined as the integral of a Gaussian and is given by $$erf(z) = \frac{2}{\pi} \int_0^z e^{-t^2} dt.$$

A rational function approximation is used to evaluate erf(z). For more information on the rational function approximation, please see Handbook of Mathematical Functions, Milton Abramowitz and Irene A. Stegun, Dover Pub., Inc., N.Y., 1972, p. 299, which is hereby incorporated by reference. The depth variable is scaled to yield the integrals of Gaussians of different widths.

If there are only a few thick beds, there is a danger that the final corrected log can look artificial. In the real log examples seen to date, this has not proved to be a problem because of the maximum bed thickness that is enforced.

The above describes fully the correction of a single phase resistivity log. The attenuation resistivity log is less resolved than the phase resistivity log. It is desirable to use the higher resolution information from the phase resistivity log to enhance the attenuation log so that both logs have the same vertical resolution. It was discovered that using the bed boundaries determined from the inflection points of the curve fit to the phase resistivity log in the inversion of the attenuation resistivity log produced a corrected attenuation resistivity log with the same vertical resolution as the corrected phase resistivity log. This matched vertical response greatly simplifies the interpretation of the results in invaded beds. Thus, better results are obtained by using the bed boundaries of the phase resistivity log.

Applying the Method to the CWR

The method of the present invention can be applied to log data obtained by any of various logging methods, including logging while drilling (LWD), induction logging, wireline logging, or laterologs. The present invention can be applied to any tool for which a forward model is available. In other words, the method of the present invention can be applied to any resistivity device. In the preferred embodiment, the method of the present invention is used in conjunction with a CWR propagation tool.

In the preferred embodiment, the CWR tool has two sets of transmitters for deep and medium depths of investigation. The CWR tool preferably has two pairs of transmitters at 55" and 25" for deep and medium depths of investigation, respectively. A phase and attenuation resistivity are measured for each spacing. All four measurements are borehole compensated, which greatly reduces the effects of borehole irregularity and symmetrizes the spatial response of the tool. This makes the simplified layer model more accurate. Each of the four measurements can be enhanced independently, i.e., processed separately, but the method is simplified if the most highly resolved measurement is used to select the bed boundaries.

The phase measurements have better vertical resolution than the attenuation measurements. In general, the vertical resolution of the attenuation measurements is poorer than that of the phase measurements by a factor of about 2.5. Thus the phase measurements are used to select the bed boundaries. In the absence of invasion, the two corrected logs should be identical.

The same boundaries are used for all the inversions on the assumption that all measurements are sensing the same layers. In addition, using the same boundaries ensures that the resulting resistivity profiles have the same effective vertical resolution. The results of one inversion can be used as a first guess of the inversion of the next measurement.

It should be emphasized that while all the logs share the same bed boundaries and use the result of one inversion in the next iteration, each of the four logs is processed separately. The medium phase and attenuation logs are better behaved in the presence of invasion than their deep counterparts. For this reason, the medium phase is processed first. The preferred embodiment makes four complete passes through the inversion method on the medium phase. Then, the same bed boundaries are used for the deep phase, and the results of the last iteration for the medium phase are used as a first guess for the deep phase. The same bed boundaries are used for the two phase curves, and four iterations are performed on the deep phase. Since the amplitude curves are more poorly resolved than the phase curves, they are processed separately. The medium attenuation curve is processed first, again with four passes through the algorithm. The last iteration on the medium attenuation is used as a starting point for the deep attenuation, and the bed boundaries from the medium phase are used.

The final rectangular and the smoothed logs are fully corrected for shoulder bed effects and have matched vertical resolution. The invasion is not evaluated and remains for later interpretation by the log analyst.

Quality Assurance

An optional final step in the processing is to re-compute the raw log at quarter-foot (3 inch) increments from the final rectangular log. This re-computed log can easily be compared to the smoothed log to estimate the accuracy of the processing. It might be possible to derive a quality assurance log by filtering the difference between the smoothed log and the re-computed log.

According to the present invention, the final step of the method is to convolve the rectangular log with a response function of finite width. This step is more than just cosmetic. Rather, this step eliminates high frequency information that could not possibly be present in the raw log because of the tool's finite vertical resolution.

Conclusion

The method of the present invention differs fundamentally from prior art methods. The method of the present invention does not attempt to find a continuous resistivity profile that could have produced the measured log. Rather, the method seeks to find a stack of much fewer discrete beds of uniform resistivity. The beds are similar in thickness to the vertical resolution of the measurement. The method finds the bed boundaries directly from the measured log. Since the number of beds is much smaller than in the continuous method, the total information is much smaller. If the tool were to encounter a very thin, conductive bed, the method typically replaces it by a thicker, less conductive one.

The method also solves the uniqueness problem by presenting the final results in an improved format. The result of current prior art inversion methods is a "rectangular log" that comprises the series of discrete beds. This log is difficult to compare to other logs because of its blocky appearance and instantaneous transitions. The sharp appearance is illusory, since the profile has higher spatial frequency information than the log, and the rectangular log is not unique.

The CWR correction technique comprises the following steps. Each step is fully automatic needing no operator input. The steps are:

(1) Perform a curve fit of the log data to obtain inflection points (preferably use a windowing method);

(2) Select the bed boundaries from the inflection points of a curve-fit of the log data;

(3) Select a control depth near the center of each bed;

(4) Estimate the resistivity (or conductivity) of each bed from the raw log data at its control depth;

(5) Using the current estimate of the resistivity (or conductivity) of the beds, compute a simulated log value at each control depth;

(6) Compare the computed log to the actual log at each control depth and adjust the resistivity (or conductivity) of each bed using the difference between the actual and simulated values at the control depths;

(7) Return to step 5 if the simulated log does not match the actual log at the control depths.

(8) Construct the corrected log from the depths of the bed boundaries and the resistivity (or conductivity) of each bed.

A primary advantage of the inversion method of the present invention is economy. In each iteration, the method computes a single forward model per bed. The present invention uses a curve fit technique to find bed boundaries. The present invention also uses multiple iterations, which is necessary to correct shoulder effect associated with a propagation tool.

Other Embodiments

The method of the present invention may be used in vertical holes with no dip, and also in dipping beds, with prior knowledge of the dip angle. Operation of the method in dipping beds will slow the process by about a factor of seven. This can be tested with simulations. It is noted that the operation of the boundary detection method in the presence of horns at bed boundaries induced by surface current effects is currently unknown.

It is also noted that the influence of invasion in this processing is generally ignored. The method of the present invention is believed to operate better in resistive beds with conductive invasion ($R_{xo} < R_t$, the typical laterolog case) than in resistive beds with resistive invasion ($R_{xo} < R_t$, the typical induction case). With simulations with resistive invasion, some horns were evident at certain combinations of bed thickness, $R_t$, $R_{xo}$, and $D_i$.

Application of the Inversion Method to Synthetic Logs

The application of the inversion algorithm to synthetic logs in vertical and deviated wells will now be presented. The limits of the inversion technique will be presented. In this context, the effects of invasion and thickness of a bed before the method breaks down will be studied. Finally the results of application to a real CWR log and its comparison to a high resolution wireline induction log in the same well will be presented.

Oklahoma Profile, No Dip

Figure 7:
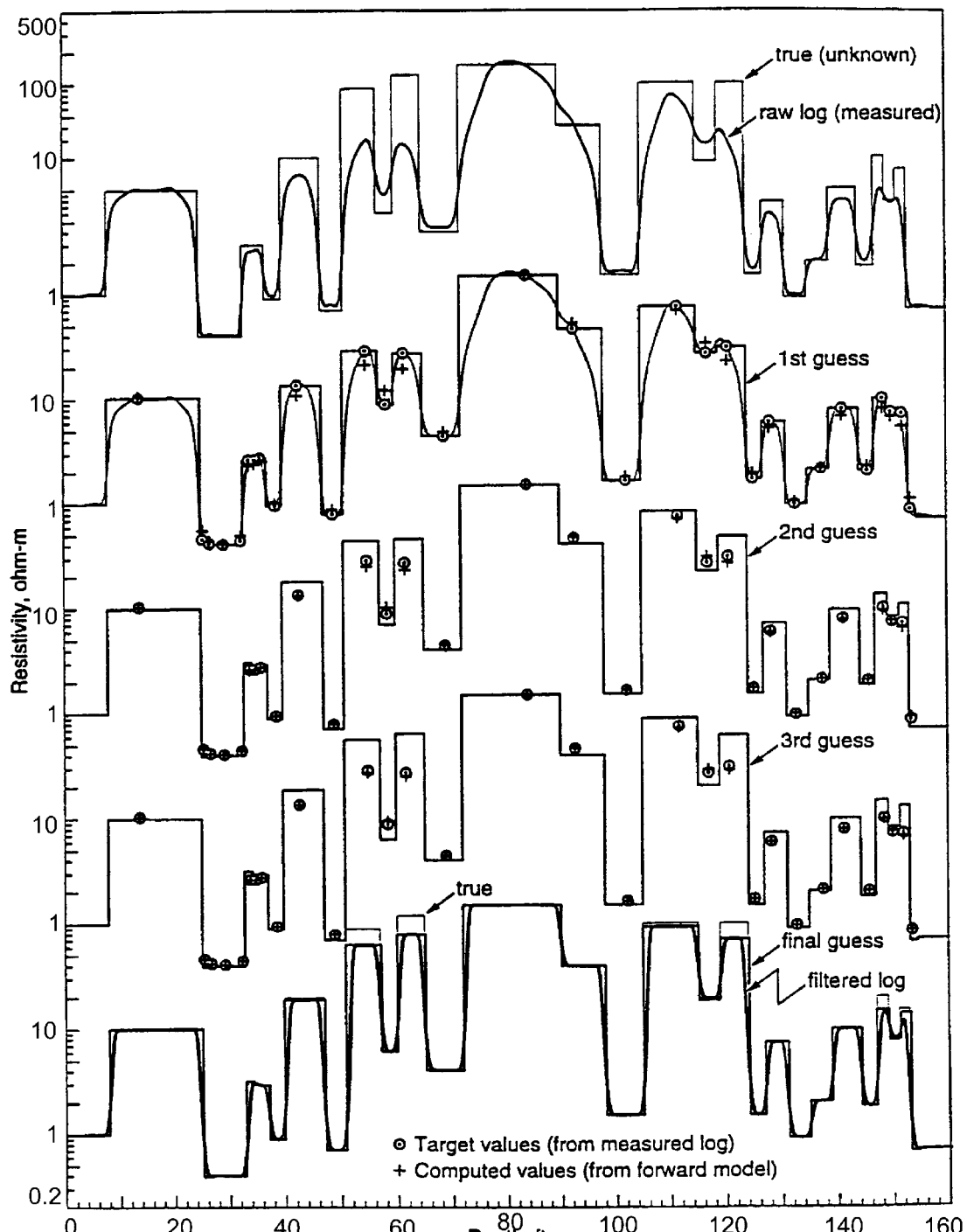
FIG. 7 illustrates operation of the method in correcting a single curve (55 degree phase) for shoulder effect.

FIG. 7 illustrates how the method progresses to correct a single resistivity curve (55" phase) for shoulder effect. The method begins with a raw resistivity log, in this case, a computer simulation through the Oklahoma profile. The top track shows the raw log and the true profile. The top track shows the raw log and the true profile. (The true profile is shown here for reference and is not known in the inversion scheme.)

The second track shows the first pass of the inversion. The method first picks the bed boundaries from the inflection points of a curve-fit. These bed boundaries do not change in subsequent iterations. Note that there are typically more inflection points than actual bed boundaries due to the response of the tool as various coils cross the bed boundaries. Next, the method picks a target for each bed value from the curve-fit near the bed centers. These are indicated by the target symbols. The method does not change either the resistivities or the depths of these target values as the inversion progresses. As a first guess, the method assumes that the log was reading correctly at the control depths. The square log is the first guess to the true profile. One can see that the first guess to the square log intersects the measured raw log at each target value. The method then computes the response of the sensor to the square profile at each control depth as indicated by the crosses. It then adjusts the resistivity of each bed based on the conductivity difference between the target value and the computed value at each control depth.

The result is the second guess square profile. The method then again computes the apparent resistivity at each control depth and repeats the adjustment process. In essence, the method seeks to place the crosses on the targets by adjusting the square profile. The method converges quickly. The second pass computed values are already within about 10% of the target resistivities.

The final square profile greatly resembles the unknown true profile. The bed boundaries of the final square log closely match those of the true profile. Finally, the method convolves the final square conductivity profile with a Gaussian filter to produce the corrected log.

Oklahoma Profile, 0 to 60 Dip

Figure 8:
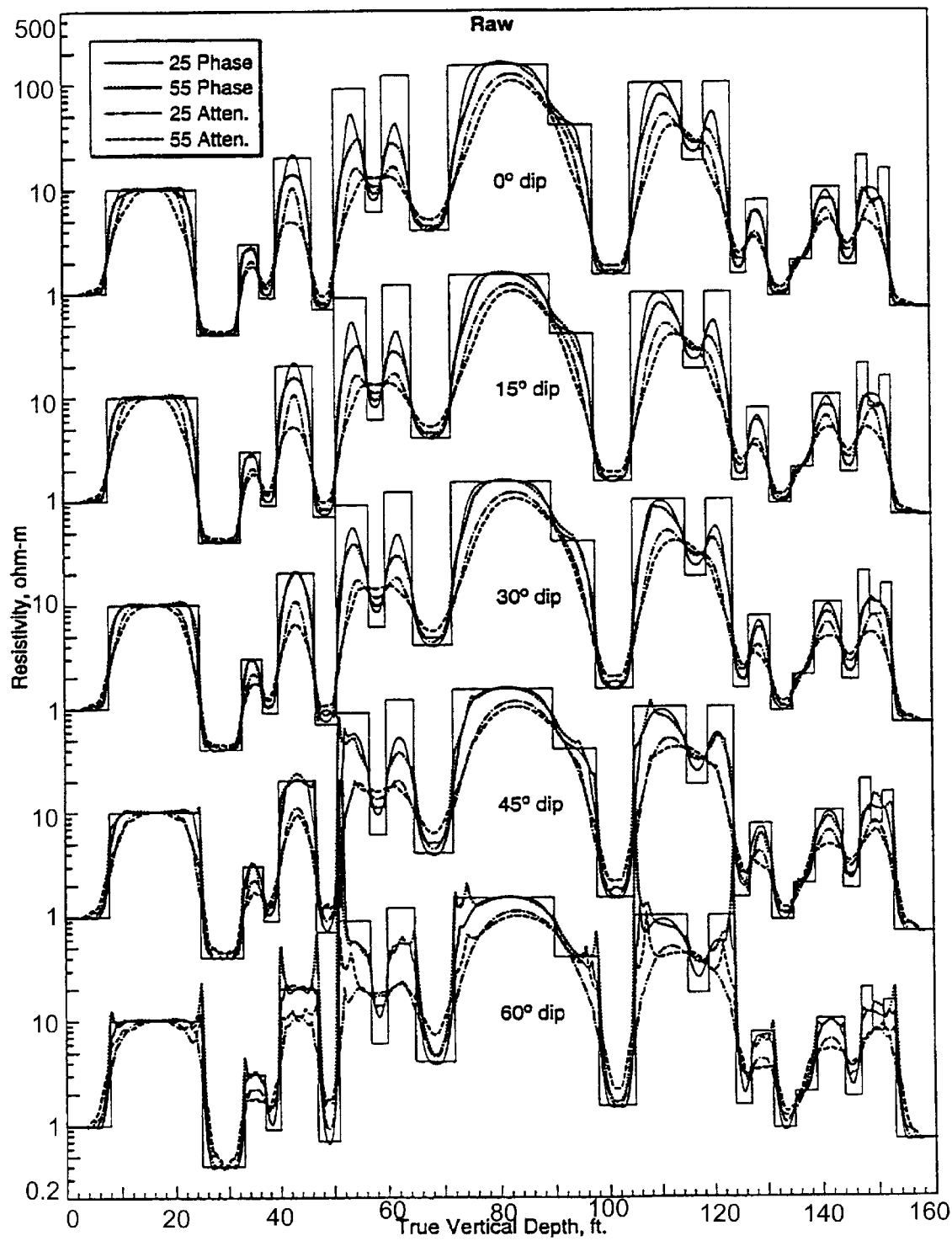
FIG. 8 illustrates the results of modeling the response of the CWR tool to an un-invaded Oklahoma formation at different dip angles.

FIG. 8 illustrates the results of modeling the response of the CWR tool to the Oklahoma profile at five dip angles. The results at various dips are offset from each other for easier comparison. There is considerable shoulder effect in the resistive beds and in thin conductive beds. Also, horns are present at higher dip angles.

Figure 9:
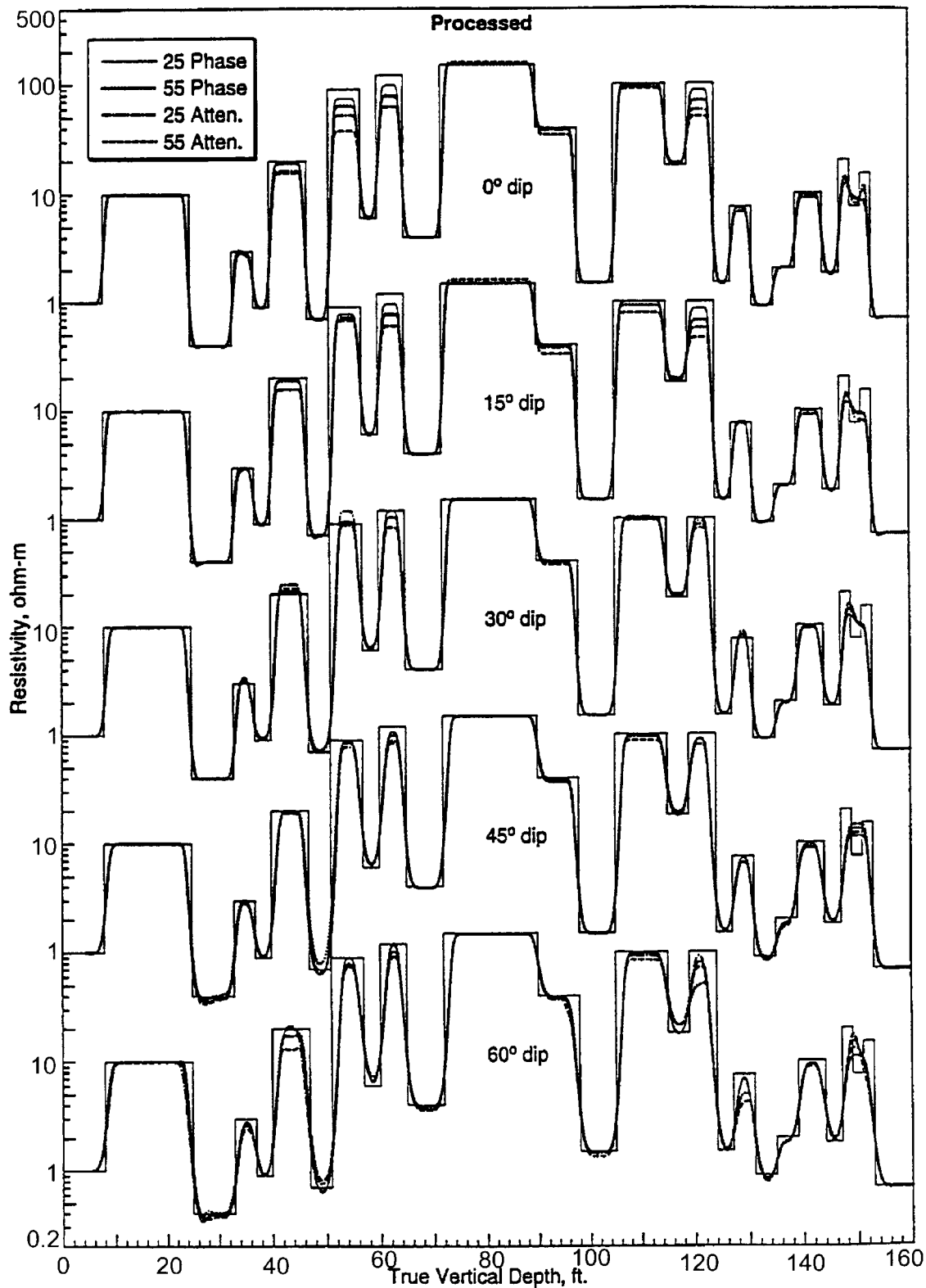
FIG. 9 illustrates the Oklahoma profiles of FIG. 8 corrected for shoulder effect according to the method of the present invention.

FIG. 9 illustrates the results in each case of the application of the new method. The dip angles were assumed to be known and were input to the forward model. It should be emphasized that the bed boundaries were determined from the data directly without any user intervention. The resulting logs show considerable improvement in the vertical resolution for each dip angle and reach correct resistivity values in most beds. The horns in the higher dip formations are also eliminated. In some of the thin resistive beds, correct values are not achieved and this is due to high contrast and data dependent choice of beds boundaries.

Uninvaded Chirp Formation, 0 to 60 Dip

Figure 10:
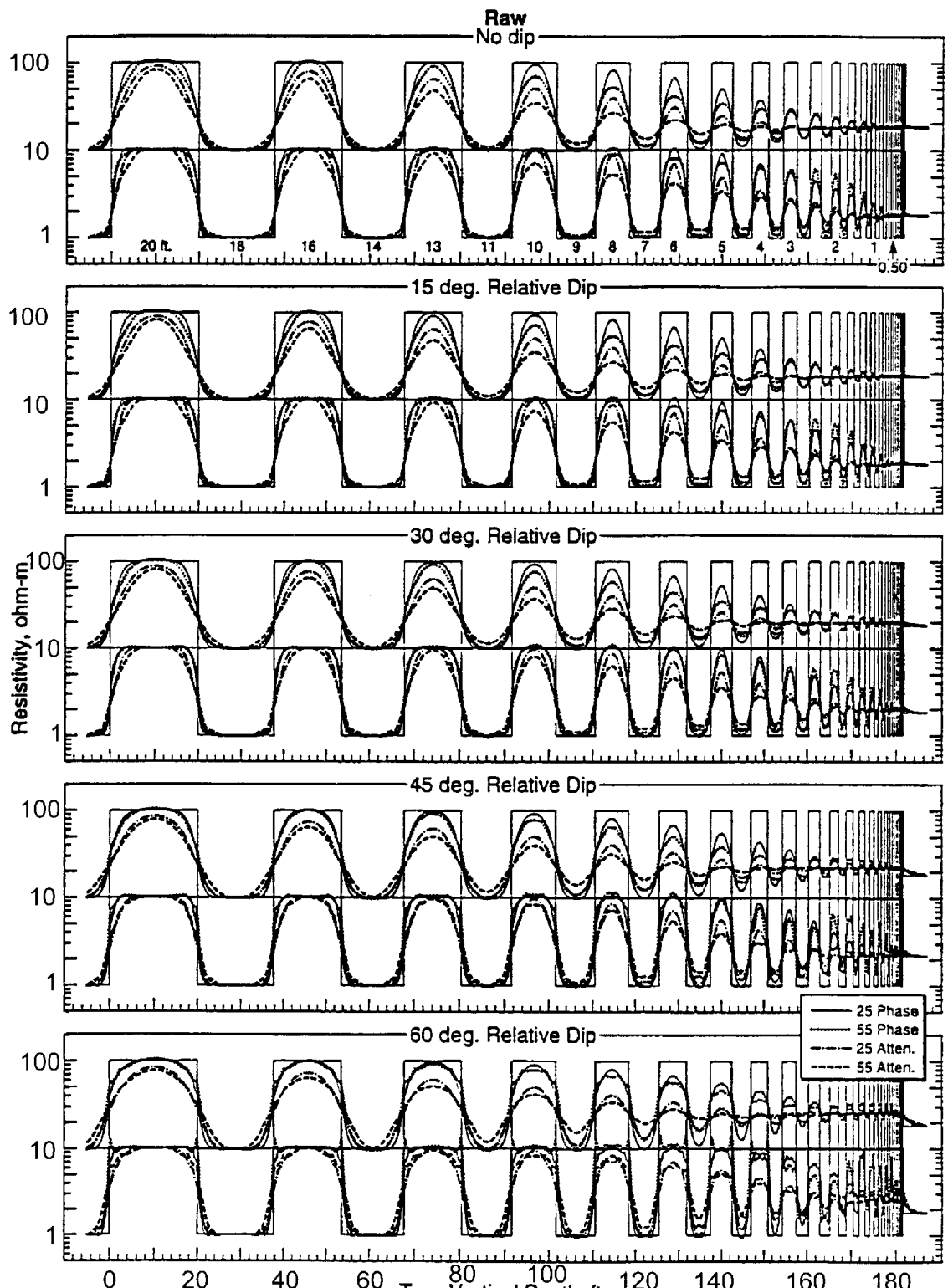
FIG. 10 illustrates the raw data of simulated CWR logs through two chirp formations at various angles of relative depth.
Figure 11:
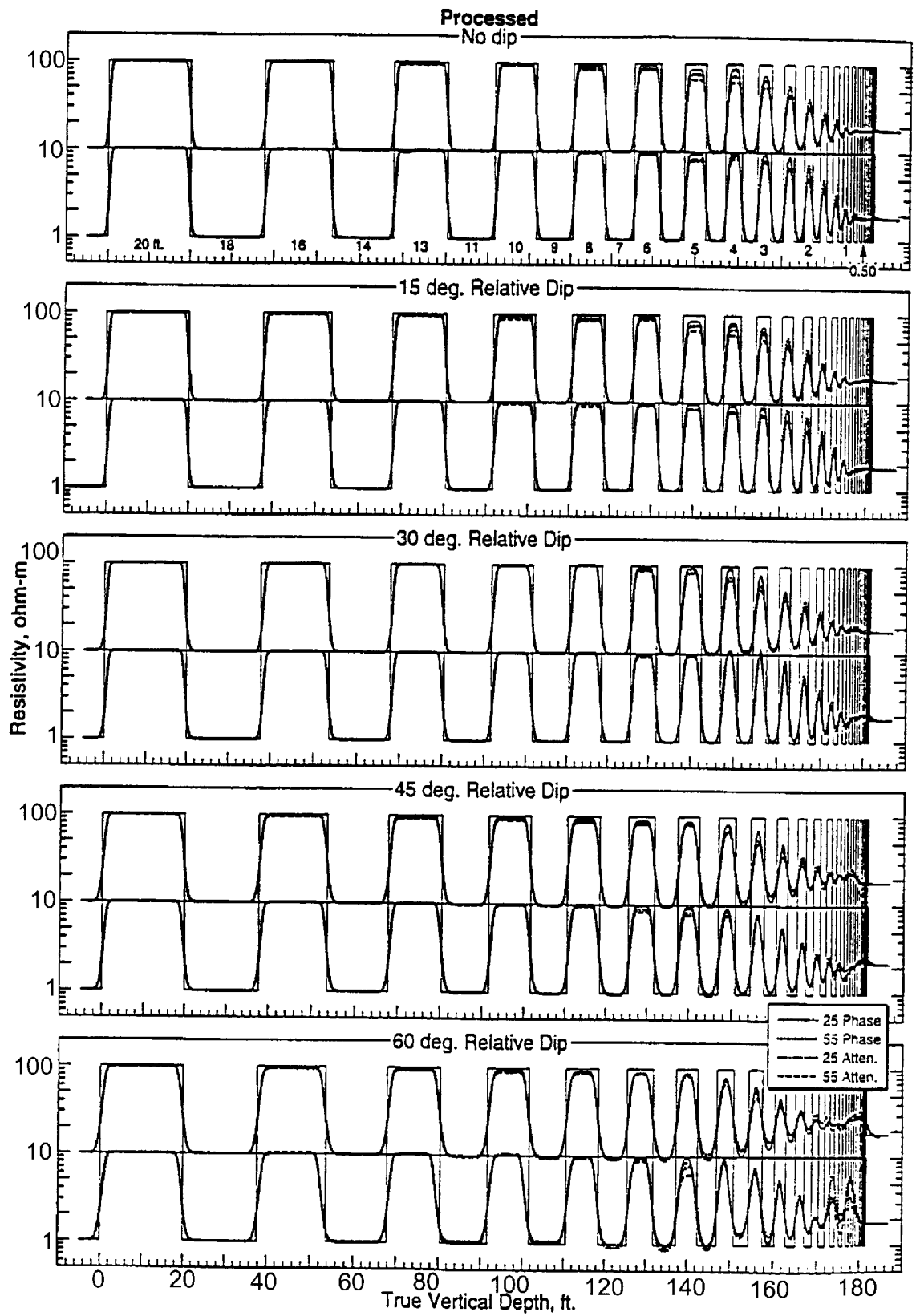
FIG. 11 illustrates the logs of FIG. 10 corrected for shoulder effect according to the present invention.

Referring now to FIGS. 10 and 11, in order to illustrate the improvement in the vertical resolution, two uninvaded chirp formations were modeled at various dip angles. One formation had a series of beds with thickness ranging from 20' down to about 2" and resistivities alternating between 100 Ω-m and 100 Ω-m. The ratio of the thicknesses of adjacent beds is $$\sqrt[6]{2}.$$

The other chirp formation had a similar series of beds with resistivities alternating between 100 Ω-m and 1 Ω-m.

FIGS. 10 and 11 illustrate the raw data and the corresponding processed results, respectively. In FIG. 10 it is evident that the vertical resolution is better at lower resistivities but in both cases it deteriorates for beds thinner than 6'. The processed results in FIG. 11 shows that beds as thin as 2.5' can be reconstructed in dips up to 30°, and in fact for dips up to 60° beds those as thin as 3' can be characterized.

For dip angles higher than 60° further research is needed to accurately determine the location of the bed boundaries in the presence of the polarization horns. Results of modeling show that formations of low relative dip (15° or less) can be corrected accurately assuming 0° dip in the forward model. For dip angles higher than 15°, the dip angle in the forward model must within 5° of the actual value.

Chirp Formation with Invasion

The principle goal of the system and method of the present invention is to minimize the shoulder bed effect so that the separations in various curves are good indicators of invasion. In order to study the effect of processing in invaded cases, two invaded chirp formations were modeled. The first one had resistive beds varying from 1' to 25' in thickness, $R_t = 10$ Ω-m, invasion diameter varying from 0" to 50" and $R_{xo} = 1.0$ Ω-m, separated by 10' of 1 Ω-m shales. The second chirp was similar except the invaded beds were conductive with $R_t = 0.2$ Ω-m.

Figure 12:
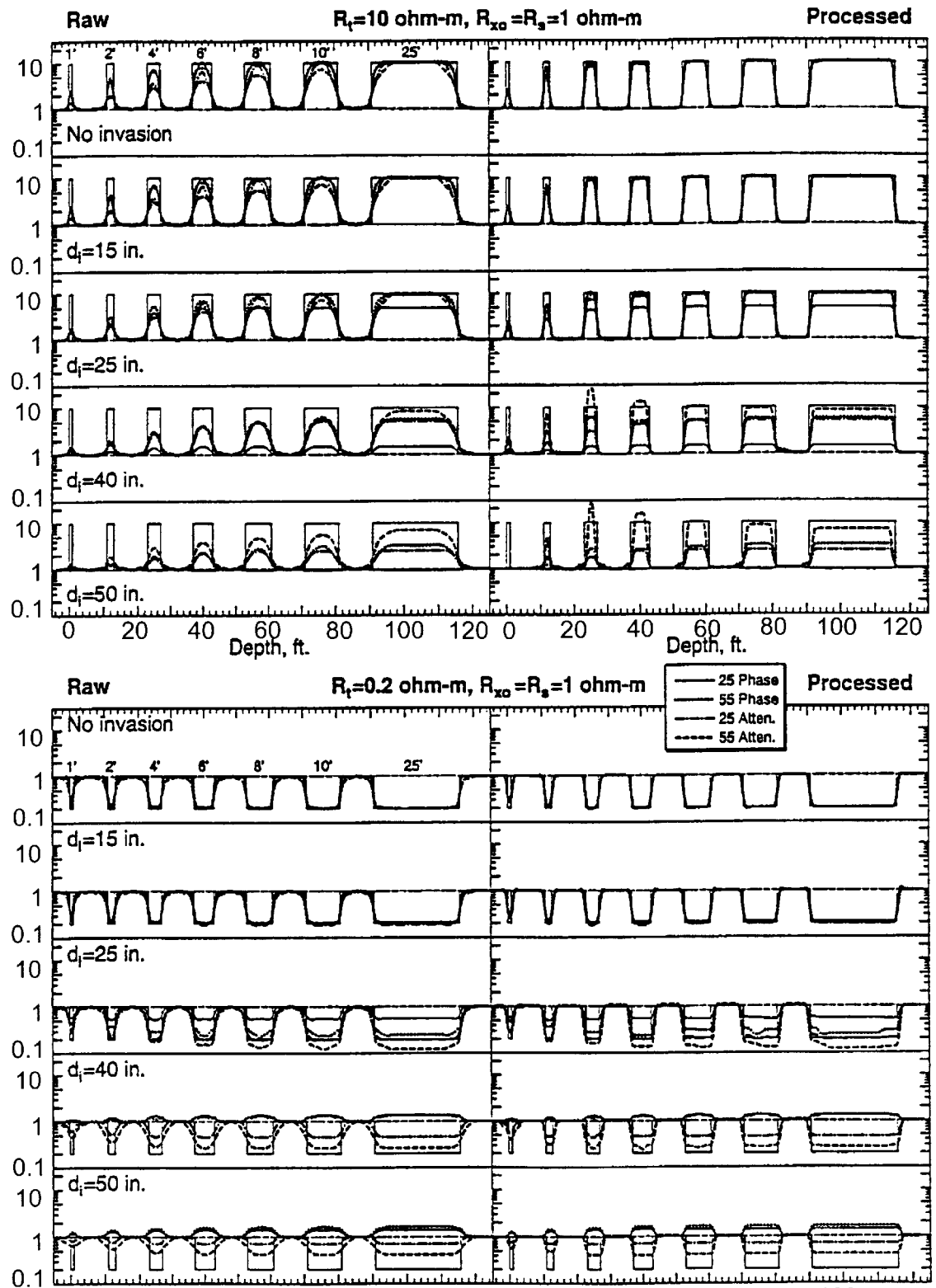
FIG. 12 illustrates simulated logs of invaded cases before and after shoulder effect correction.

FIG. 12 illustrates the modeled raw resistivity data for both the chirps formations and the processed results. In FIG. 12, the modeled raw resistivity data for both the chirps formations are shown on the left, and the processed results are shown on the right. In both the cases the bed boundaries are delineated much more sharply in the processed results. For uninvaded thin beds, the raw phases and attenuations separate due to should bed effect, which may be misinterpreted as invasion. However, this separation is eliminated after processing. The raw resistivity values in the center of beds thicker than 15' equals the correct formation $R_t$; however, the processing improves the values near the edges.

As the invasion advances, in thick beds, the raw and processed values are the same and are equal to the values which would have been measured had the invaded beds been of infinite thickness. For thinner beds in the resistive bed formation a considerable improvement down to 4' thick beds is seen. In conductive bed formation there is improvement down to 2' beds. Even in the thinner beds the processed values are closer to the infinitely thick bed values, and hence the formation resistivity $R_t$ and the invasion parameters such as $R_{xo}$, and $D_i$ can be better estimated using the processed value in the appropriate step-invasion tornado charts. In case of the resistive bed formation with $D_i$ of 25" in beds thinner than 10' an examination of the log values reveals that the order of 55" phase and 55" attenuation resistivities are reversed. Similarly, the order of 25" phase and 25" attenuation resistivities are reversed in beds thinner than 4'. This would lead to an erroneous conclusion that these are conductive bed with resistive invasion. After processing the correct order is restored with values closer to those in infinitely-thick invaded formation.

LWD Log Inversion Example

Figure 13:
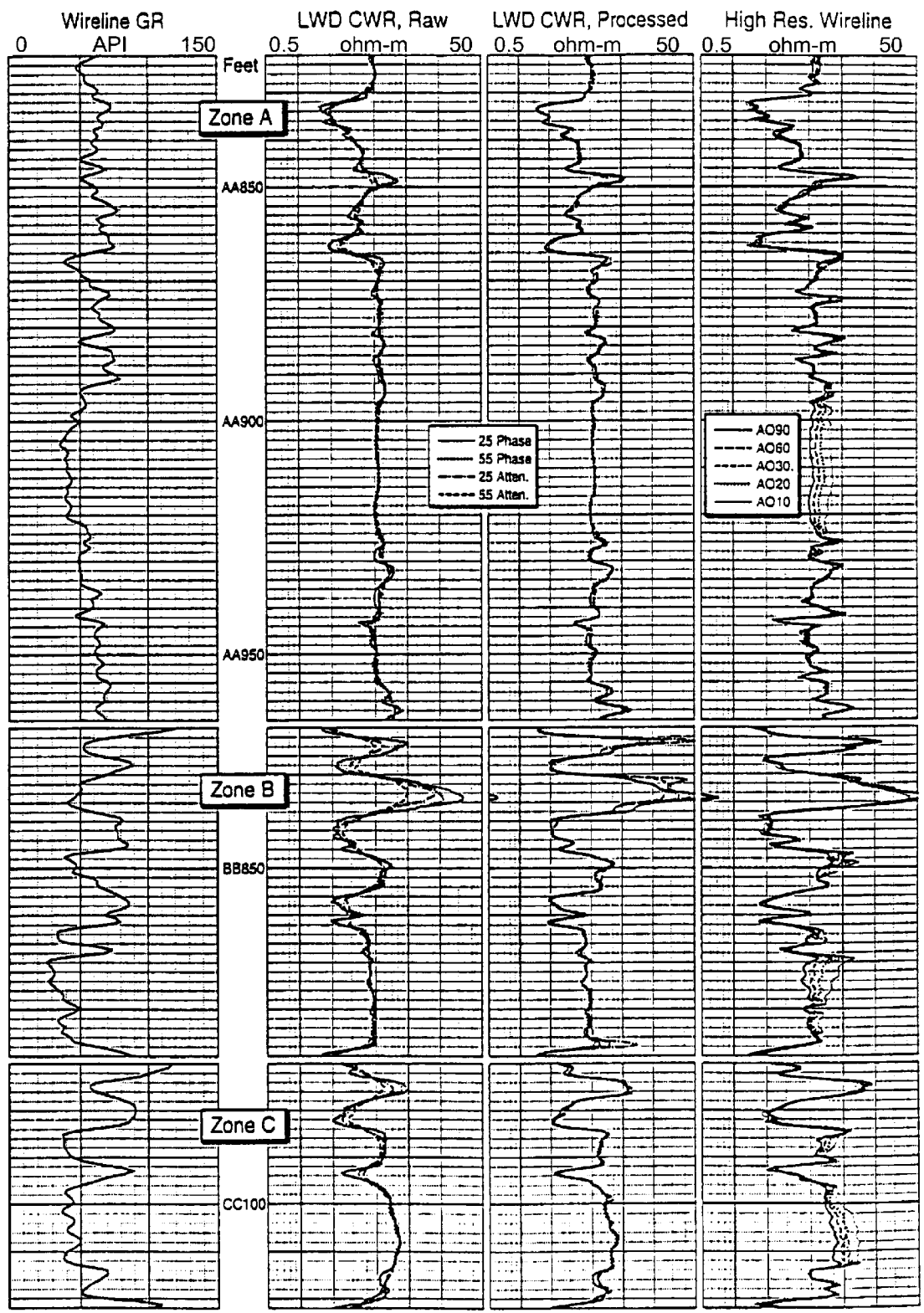
FIG. 13 illustrates a comparison of LWD CWR log to wireline high resolution resistivity log.

FIG. 13 illustrates LWD field logs, wherein these LWD field logs show the application of enhancement. The CWR and high resolution wireline induction logs were obtained from a near vertical well drilled in the Gulf of Mexico across a sand-shale interval where numerous thin beds are evident. The CWR log was recorded during the drilling operations 84' behind the bit. During drilling, the average rate of penetration varied from 50–200 feet per hour, averaging about 75 feet per hour, for an elapsed formation exposure time of 1 hour. The $R_m$ was 1.10 $\Omega$-m and $R_m$ was 1.03 $\Omega$-m at formation temperature. The wireline log was recorded six days later. The wireline log has a better vertical resolution and deeper radial depth of investigation than the standard CWR log and hence it is used as the reference even though there may be some invasion effects.

The correlation gamma ray in track 1 comes from the wireline log. Tracks 2 and 3 compare the standard and vertically-enhanced CWR. The high resolution wireline log is shown in track 4 for comparison. The three intervals selected from the well contain thin beds that present a challenge to accurate evaluation of the formation properties. A summary of typical points taken from these intervals is shown in Table 1 and discussed in detail below.

Zone A encloses a series of thin permeable beds and a thick water sand. Many of these thin beds show separation of the curves; however, it is difficult to determine the cause of the separation in thin beds based solely on the resistivity logs. The possible causes are shoulder bed, dielectric permittivity, anistropy and invasion. Thin beds from AA832 to AA864 are evident on the wireline log; some are shales and some permeable sands. The standard CWR across the bounding shales at AA832–835 and AA861–864 shows significant thin bed effect where the shallow phase resistivity curve reads much lower than the other curves. This separation disappears on the enhanced CWR as the expected in unaltered shales.

The interval from AA847 to AA851 appears to be invaded on the wireline log. Enhancing the CWR gives a normal-looking invasion profile in this thin bed. When, the invasion parameters are computed using the invasion correction chart, the resulting diameters of invasion ($D_i$) are very similar in both cases, but the $R_t$ from the enhanced CWR resistivity is closer to the target resistivity.

In the thick water zone (AA896–924), the resistivity response on both the standard and enhanced CWR is similar to the wireline log. This shows that the enhancement method does not affect the thick bed resistivity measurement. (Invasion effects are seen on the wireline as a significant separation between all the curves. The deep reading resistivity from the wireline log is assumed to be closest to the actual formation resistivity.)

Table 1 contains an interpretation of typical points in Zone B using the invasion correction chart. Several thin beds are evident within each of the two high resistivity beds at the top of the interval (BB822–26 and BB830–39). In the top interval (BB822–26), the standard CWR shows only one gross resistivity. While clearly delineated on the wireline, a second thin bed shows up as a plateau on the enhanced CWR. The enhanced processing causes an overshoot on the attenuation curves. However, the invasion correction using the tornado chart gives an $R_t$ estimate from the enhanced CWR (29 $\Omega$-m) that is much closer to the wireline value (26 $\Omega$-m) than from the standard $R_t$ (5 $\Omega$-m).

The lower high resistivity interval (BB830–39) has problems that are probably due to the presence of beds much thinner than the tool can accurately resolve. The wireline shows several thin beds of varying resistivity. The standard CWR shows a single bed from the attenuation curves, but four beds from the phase curves, particularly the shallow phase. The enhanced CWR shows all these beds across the interval. The enhanced CWR response in the first two beds is probably caused by the way the algorithm partitions the interval into beds. The upper zone reads high because of the bed is thin with a very high resistivity bed next to it. The next bed reads low because it is so thin that the enhanced processing is unable to resolve it properly. Finally, the lowest bed in the series appears as a plateau in the resistivity (BB836–38); however no comparison can be drawn since the wireline log does not show presence of such a bed.

In Zone C (Table 2), the enhanced CWR log is a better match for the high resolution wireline logs. In the water sand (CC100–113), the wireline log reads approximately 0.5 $\Omega$-m higher than either of the CWR logs. This increase is probably due to invasion.

TABLE 1

Comparison of standard and enhanced CWR with a high resolution wireline log in zone B.

| Depth | | R25P | R25A | R55P | R55A | Di | Rxo | Rt | Rwl | % Diff |
|---|---|---|---|---|---|---|---|---|---|---|
| BB822-24 | CWR | 4.5 | 9.7 | 5.5 | 8.5 | 45 | 2.3 | 18.6 | 25.7 | 28 |
| | ECWR | 18.1 | 53.3 | 14.8 | 25.4 | 45 | 3.7 | 29.6 | | -15 |
| BB824-26 | CWR | 4.8 | 6.6 | 4.4 | 6.4 | 52 | 3.0 | 6.5 | 12.5 | 48 |
| | ECWR | 7.6 | 6.2 | 8.3 | 8.5 | 20 | 20.7 | 8.3 | | 34 |
| BB826-30 | CWR | 2.2 | 3.0 | 2.2 | 3.4 | 53 | 1.7 | 3.5 | 1.9 | -83 |
| | ECWR | 2.0 | 2.3 | 2.0 | 2.1 | — | 1.6 | 2.1 | | -8 |
| BB830-32 | CWR | 13.0 | 9.5 | 12.2 | 8.0 | 45 | 15.6 | 9.4 | 15.0 | 38 |
| | ECWR | 12.5 | 42.4 | 11.5 | 22.6 | 45 | 0.9 | 28.7 | | -91 |

TABLE 1-continued

Comparison of standard and enhanced CWR
with a high resolution wireline log in zone B.

| Depth | | R25P | R25A | R55P | R55A | Di | Rxo | Rt | Rwl | % Diff |
|---|---|---|---|---|---|---|---|---|---|---|
| BB833-36 | CWR | 33.1 | 15.9 | 21.3 | 9.4 | 37 | 30.2 | 10.9 | 65.9 | 84 |
| | ECWR | 60.7 | 46.2 | 36.1 | 25.2 | 46 | 41.3 | 25.6 | | 61 |
| BB842-44 | CWR | 3.1 | 2.9 | 3.2 | 2.9 | 50 | 3.3 | 2.9 | 3.7 | 20 |
| | ECWR | 3.2 | 3.3 | 3.2 | 3.3 | — | 3.0 | 3.3 | | 11 |
| BB848-50 | CWR | 7.0 | 5.8 | 6.7 | 5.6. | 42 | 7.2 | S.8 | 8.2 | 30 |
| | ECWR | 7.9 | 8.1 | 7.6 | 8.4 | — | 7.7 | 8.5 | | -4 |
| BB869-71 | CWR | 4.7 | 4.3 | 4.6 | 4.3 | 39 | 4.9 | 4.4 | 5.9 | 26 |
| | ECWR | 4.9 | 4.7 | 4.8 | 4.7 | — | 4.7 | 4.7 | | 19 |

TABLE 2

Comparison of standard and enhanced CWR
with a high resolution wireline log in zone C.

| Depth | | R25P | R25A | R55P | R55A | Di | Rxo | Rt | Rwl | % Diff |
|---|---|---|---|---|---|---|---|---|---|---|
| CC073-78 | CWR | 9.6 | 7.1 | 8.5 | 5.8 | 45 | 9.6 | 6.0 | 15.1 | 60 |
| | ECWR | 11.4 | 12.3 | 10.9 | 10.9 | — | 10.9 | 10.9 | | 28 |
| CC084-86 | CWR | 5.8 | 4.8 | 5.9 | 4.7 | 44 | 6.3 | 4.8 | 11.1 | 57 |
| | ECWR | .6.9 | 7.2 | 6.7 | 7.0 | — | 6.5 | 7.1 | | 36 |
| CC090-92 | CWR | 5.4 | 4.7 | 5.6 | 4.9 | 42 | 5.9 | 5.1 | 8.2 | 38 |
| | ECWR | 6.2 | 6.5 | 5.9 | 6.2 | — | 5.9 | 6.5 | | 21 |
| CC092-94 | CWR | 2.5 | 3.4 | 2.4 | 3.8 | 55 | 1.7 | 3.8 | 2.0 | -92 |
| | ECWR | 2.2 | 2.3 | 2.1 | 2.3 | — | 2.1 | 2.1 | | -7 |
| CC109-12 | CWR | 7.4 | 7.2 | 7.2 | 7.3 | — | 7.2 | 7.2 | 8.0 | 10 |
| | ECWR | 7.6 | 7.6 | 7.4 | 7.9 | — | 7.5 | 8.1 | | -1 |

Table 1: The log data in this table is from selected intervals in the well. The standard response is compared with the enhanced response across each interval. The first sets of columnar data are the log values for each spacing,. The next columns arc obtained from the standard LWD tornado chart. The values computed from the tornado chart are then compared with the wireline resistivity taken as the reference resistivity of the formation. The last column percentage difference between the CWR or ECWR and the standard wireline log.

Explanation of abbreviations used in the Table 1:

| | |
|---|---|
| CWR | standard CWR values |
| ECWR | Enhanced CWR values |
| R25P | Ω, phase based resistivity for 25" transmitter spacing |
| R25A | Ω, attenuation based resistivity for 25" transmitter spacing |
| R55P | Ω, phase based resistivity for 55" transmitter spacing |
| R55A | Ω, attenuation based resistivity for 55" transmitter spacing |
| $D_i$ | inches, Diameter of invasion |
| $R_t$ | Ω-m, Formation Resistivity computed using LWD tornado charts |
| $R_{xo}$ | Ω-m, Invasion Resistivity computed using LWD tornado charts |
| Rwl | Ω-m, Resistivity from high resolution wireline log |
| % Diff | percentage difference between the CWR or ECWR and the standard wireline log |

Interpretation of the logs using a standard step-invasion interpretation (tornado chart) shows that the resistivity from the enhanced resistivity approaches the correct values much quicker than the standard data. For a low-resistivity interval, convergence occurs within 1–2 feet depending on invasion. In the un-invaded case, this is also true for the higher resistivities, but due to the overshoot in the enhancements, the invaded cases underestimate $R_t$ and overestimate $R_{xo}$ until about 5 feet. However, the standard log still seems to indicate invasion at 10' thick beds. In the lower resistivities, the uninvaded case gives acceptable resistivities in beds as thin as 2 feet. But invasion As the invasion advances, in thick beds, the raw and processed values are the same and are equal to the values which would have been measured had the invaded beds been of infinite thickness. For thinner beds in the resistive bed formation we see a considerable improvement down to 4' thick beds. In conductive bed formation with we see improvement down to 2' beds. Even in the thinner beds the processed values are closer to the infinitely thick bed values, and hence the formation resistivity $R_t$, and the invasion parameters such as $R_{xo}$, and $D_i$ can be better estimated using the processed value in the appropriate step invasion tornado charts. In case of the resistive bed formation with $D_i$ of 25" in 4' and 6' beds the order of 25" and 55" phase resistivities are reversed. Similarly, the order of 25" and 55" attenuation resistivities are reversed. This would lead us to wrongly conclude that there is a conductive bed with resistive invasion. After processing the correct order is restored with values close to those in infinitely-thick invaded formation.

Conclusion

Therefore, instead of determining an earth formation to match the entire log, the method seeks to find a minimum number of layers for which the tool response will match the log at judiciously selected log points. The bed boundaries are determined directly from the measured log using a novel windowing technique. The selected beds are no thinner than the vertical resolution of the measurement. If the tool were to encounter a conductive bed thinner than the tool resolution, the method will replace it by a thicker, less conductive one.

The steps are: (1) Select the bed boundaries from the inflection points of a curve-fit of the log data. (2) Select a control depth near the center of each bed and estimate the resistivity of each bed from the raw log data at this control depth. (3) Use the measured resistivity at control depth as the initial estimate of the true resistivity. (4) Using the current estimate of the resistivity of the beds, compute a simulated log value at each control depth. (5) Compare the computed log to the actual log at each control depth and adjust the resistivity of each bed using the difference between the actual and simulated values at the control depths. (6) If the simulated log does not match the actual log at the control depths, go back to step 4. (7) Construct the corrected log from the depths of the bed boundaries and the resistivity of each bed.

The present invention thus comprises a layer inversion technique for enhancing the vertical resolution of 2 MHz propagation tools. The resulting logs are corrected for shoulder bed effects so that the remaining separation is primarily due to invasion. In addition the resulting vertical resolution is comparable to high resolution wireline tools making it easier to study the time lapsed invasion. The method can also be applied to logs in dipping formation or deviated wells. The comparison with actual logs confirm the improvements predicted by modeled logs.

We claim:

1. A method for performing inversion resistivity on log data to determine a model formation, comprising:

performing logging on a formation to obtain a resistivity log, wherein the resistivity log comprises log data;

selecting one or more control depths at one or more locations of each of a plurality of detected beds in the formation;

estimating the resistivity of each bed only at the selected control depths, wherein said estimating uses the log data, wherein said estimating produces an estimated resistivity for each of the beds;

computing a simulated log value at each control depth using a current estimate of the resistivity of the beds, wherein said computing uses said estimated resistivities at said selected control depths as an initial estimate of the true resistivity;

comparing the computed simulated log to the actual log data at each control depth;

adjusting the resistivity of each bed using the difference between the actual and simulated values at the control depths;

repeating said steps of computing a simulated log value at each control depth using the current estimate of the resistivity of the beds, comparing the computed log to the actual log at each control depth, and adjusting the resistivity of each bed using the difference between the actual and simulated values at the control depths, wherein said repeating is performed if the simulated log does not match the actual log at the control depths;

constructing a corrected log from the depths of the bed boundaries and the resistivity of each bed if the simulated log substantially matches the actual log at the selected control depths.

2. The method of claim 1, further comprising:

selecting one or more bed boundaries prior to said selecting one or more control depths;

wherein said selecting one or more control depths at one or more locations of each of said plurality of detected beds in the formation uses said selected bed boundaries.

3. The method of claim 2, wherein said selecting one or more control depths comprises selecting a control depth in a location between each of said selected bed boundaries.

4. The method of claim 2, wherein said selecting one or more bed boundaries comprises:

performing a curve fit of the log data after said performing logging while drilling;

determining inflection points of the log data after said performing a curve fit of the log data; and selecting bed boundaries from the inflection points of the curve-fit of the log data.

5. The method of claim 4, wherein said performing a curve fit of the log data comprises performing a curve fit of the apparent conductivity log data.

6. The method of claim 4, wherein said performing a curve fit of the log data comprises fitting a polynomial in depth to the conductivity.

7. The method of claim 6, wherein said performing a curve fit of the log data comprises fitting a polynomial in depth to the conductivity for low dip angles; and wherein said performing a curve fit of the log data comprises fitting a polynomial in depth to the log of the resistivity for high dip angles.

8. The method of claim 6, wherein said performing a curve fit of the log data comprises fitting a cubic polynomial in depth to the conductivity using a least-squares method.

9. The method of claim 8, wherein said performing a curve fit of the log data comprises fitting a cubic polynomial in depth to the conductivity using a weighted linear least-squares method.

10. The method of claim 9, wherein said weighted linear least-squares method uses a weighting function which is Gaussian in depth, wherein said Gaussian weighting function provides smoothness as said window is moved across said log data.

11. The method of claim 6, wherein said performing a curve fit of the log data is performed a plurality of times on said log data using a windowing method, wherein said windowing method comprises moving a window across said log data at periodic increments, and performing said curve fit on said window of log data at said periodic increments as said window is moved across said log data.

12. The method of claim 11, wherein said determining inflection points of the log data comprises evaluating said fitted cubic polynomial at the center of said window as said window is moved across said log data.

13. The method of claim 11, further comprising:

subtracting an offset from depth prior to said performing said curve fit of the log data for each of said windows, wherein said subtracting causes the transformed depth to be zero at the center of said window.

14. The method of claim 2, wherein said selecting one or more bed boundaries comprises:

examining resistivity with respect to depth using said resistivity log; and discarding one or more boundaries in response to said examining.

15. The method of claim 2, wherein said selecting one or more bed boundaries comprises:

examining a derivative of the logarithm of the resistivity with respect to depth using said resistivity log; and discarding one or more boundaries in response to said examining.

16. The method of claim 2, wherein said selecting one or more bed boundaries comprises:

examining an absolute value of the first derivative of the logarithm of the resistivity with respect to depth; and discarding one or more boundaries in response to said examining.

17. The method of claim 16, wherein said discarding comprises discarding bed boundaries with absolute values below a first threshold.

18. The method of claim 2, wherein said selecting one or more bed boundaries comprises:

examining at least one pair of bed boundaries closer in depth than a pre-defined tolerance;

determining if the first derivatives of control depths of each of said at least one pair of bed boundaries have the same sign;

determining which of said first derivatives of said control depths of each of said at least one pair of bed boundaries is smaller in magnitude; and discarding a bed boundary of said at least one pair of bed boundaries whose first derivative is smaller in magnitude.

19. The method of claim 1, wherein said performing logging on a formation to obtain a resistivity log comprises performing logging while drilling (LWD) on the formation to obtain a LWD resistivity log.

20. The method of claim 1, wherein said performing logging on a formation to obtain a resistivity log comprises performing induction logging on the formation to obtain the resistivity log.

21. The method of claim 1, wherein said performing logging on a formation to obtain a resistivity log comprises performing wireline logging on the formation to obtain the resistivity log.

22. A method for performing inversion resistivity on log data to determine a model formation, comprising:

performing logging on a formation to obtain a resistivity log, wherein the resistivity log comprises log data;

performing a curve fit of the log data after said performing logging while drilling;

determining inflection points of the log data after said performing a curve fit of the log data;

selecting bed boundaries from the inflection points of the curve-fit of the log data;

selecting one or more control depths at one or more locations of each of a plurality of detected beds in the formation;

estimating the resistivity of each bed only at the selected control depths, wherein said estimating uses the log data, wherein said estimating produces an estimated resistivity for each of the beds;

computing a simulated log value at each control depth using a current estimate of the resistivity of the beds, wherein said computing uses said estimated resistivities at said selected control depths as an initial estimate of the true resistivity;

comparing the computed simulated log to the actual log data at each control depth;

adjusting the resistivity of each bed using the difference between the actual and simulated values at the control depths;

repeating said steps of computing a simulated log value at each control depth using the current estimate of the resistivity of the beds, comparing the computed log to the actual log at each control depth, and adjusting the resistivity of each bed using the difference between the actual and simulated values at the control depths, wherein said repeating is performed if the simulated log does not match the actual log at the control depths;

constructing a corrected log from the depths of the bed boundaries and the resistivity of each bed if the simulated log substantially matches the actual log at the selected control depths.

23. A method for determining bed boundaries in a formation from resistivity log data, comprising:

performing logging on a formation to obtain a resistivity log, wherein the resistivity log comprises log data;

performing a curve fit of the log data after said performing logging while drilling;

determining inflection points of the log data after said performing a curve fit of the log data; and determining bed boundaries from the inflection points of the curve-fit of the log data.

24. The method of claim 23, wherein said performing a curve fit of the log data comprises performing a curve fit of the apparent conductivity log data.

25. The method of claim 24, wherein said performing a curve fit of the log data comprises fitting a polynomial in depth to the conductivity.

26. The method of claim 25, wherein said performing a curve fit of the log data comprises fitting a polynomial in depth to the conductivity for low dip angles; and wherein said performing a curve fit of the log data comprises fitting a polynomial in depth to the log of the resistivity for high dip angles.

27. The method of claim 25, wherein said performing a curve fit of the log data comprises fitting a cubic polynomial in depth to the conductivity using a least-squares method.

28. The method of claim 27, wherein said performing a curve fit of the log data comprises fitting a cubic polynomial in depth to the conductivity using a weighted linear least-squares method.

29. The method of claim 28, where in said weighted linear least-squares method uses a weighting function which is Gaussian in depth, wherein said Gaussian weighting function provides smoothness as said window is moved across said log data.

30. The method of claim 25, wherein said performing a curve fit of the log data is performed a plurality of times on said log data using a windowing method, wherein said windowing method comprises moving a window across said log data at periodic increments, and performing said curve fit on said window of log data at said periodic increments as said window is moved across said log data.

31. The method of claim 30, wherein said determining inflection points of the log data comprises evaluating said fitted cubic polynomial at the center of said window as said window is moved across said log data.

32. The method of claim 31, further comprising:

subtracting an offset from depth prior to said performing said curve fit of the log data for each of said windows, wherein said subtracting causes the transformed depth to be zero at the center of said window.

33. The method of claim 23, wherein said performing logging on a formation to obtain a resistivity log comprises performing logging while drilling (LWD) on the formation to obtain a LWD resistivity log.

34. The method of claim 23, wherein said performing logging on a formation to obtain a resistivity log comprises performing induction logging on the formation to obtain the resistivity log.

35. The method of claim 23, wherein said performing logging on a formation to obtain a resistivity log comprises performing wireline logging on the formation to obtain the resistivity log.

36. The method of claim 23, wherein said determining bed boundaries further comprises:

examining resistivity with respect to depth using said resistivity log; and discarding one or more boundaries in response to said examining.

37. The method of claim 23, wherein said determining bed boundaries further comprises:
   examining a derivative of the logarithm of the resistivity with respect to depth using said resistivity log; and
   discarding one or more boundaries in response to said examining.

38. The method of claim 23, wherein said determining bed boundaries further comprises:
   examining an absolute value of the first derivative of the logarithm of the resistivity with respect to depth; and
   discarding one or more boundaries in response to said examining.

39. The method of claim 38, wherein said discarding comprises discarding bed boundaries with absolute values below a first threshold.

40. The method of claim 23, wherein said selecting one or more bed boundaries comprises:
   examining at least one pair of bed boundaries closer in depth than a pre-defined tolerance;
   determining if the first derivatives of control depths of each of said at least one pair of bed boundaries have the same sign;
   determining which of said first derivatives of said control depths of each of said at least one pair of bed boundaries is smaller in magnitude; and
   discarding a bed boundary of said at least one pair of bed boundaries whose first derivative is smaller in magnitude.

* * * * *